(12) United States Patent
McCarthy et al.

(10) Patent No.: US 12,140,478 B2
(45) Date of Patent: Nov. 12, 2024

(54) METHOD AND SYSTEM FOR ELEMENT IDENTIFICATION VIA OPTICAL EMISSION SPECTROSCOPY

(71) Applicant: Agilent Technologies, Inc., Santa Clara, CA (US)

(72) Inventors: Daniel Finn McCarthy, Noble Park (AU); Mark Andrew Woods, Emerald (AU)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/766,184

(22) PCT Filed: Dec. 23, 2019

(86) PCT No.: PCT/IB2019/061259
§ 371 (c)(1),
(2) Date: Apr. 1, 2022

(87) PCT Pub. No.: WO2021/079184
PCT Pub. Date: Apr. 29, 2021

(65) Prior Publication Data
US 2024/0053201 A1 Feb. 15, 2024

(30) Foreign Application Priority Data

Oct. 22, 2019 (AU) ............................... 2019903971
Oct. 31, 2019 (AU) ............................... 2019904107

(51) Int. Cl.
G01J 3/443 (2006.01)
G01N 21/73 (2006.01)
G01J 3/28 (2006.01)

(52) U.S. Cl.
CPC ............ *G01J 3/443* (2013.01); *G01N 21/73* (2013.01); *G01J 2003/2843* (2013.01); *G01J 2003/2859* (2013.01); *G01J 2003/2866* (2013.01)

(58) Field of Classification Search
CPC ............... G01J 3/443; G01J 2003/2843; G01J 2003/2859; G01J 2003/2866; G01N 21/73
See application file for complete search history.

(56) References Cited

U.S. PATENT DOCUMENTS

| 5,705,787 A | 1/1998 | Karanassios |
| 2015/0025847 A1 | 1/2015 | Baudelet |
| 2015/0153225 A1 | 6/2015 | Baudelet |

FOREIGN PATENT DOCUMENTS

| CN | 102564965 B | 10/2014 |
| CN | 104101593 A | 10/2014 |

(Continued)

OTHER PUBLICATIONS

EPO, "Extended European Search Report Received mailed on Oct. 10, 2023," Application No. 19949726.4, 11 pages.

(Continued)

*Primary Examiner* — Jamil Ahmed

(57) ABSTRACT

The present invention is directed to a computer-implemented method of automatically identifying the presence of one or more elements in a sample via optical emission spectroscopy. The method includes the steps of obtaining sample spectrum data from the sample, obtaining a list of one or more predetermined emission wavelengths for each element in the periodic table quantifiable by optical emission spectroscopy, each predetermined emission wavelength being associated with a list of one or more potential interference emission wavelengths, determining a list of one or more analyte wavelengths corresponding to spectral peaks in the sample spectrum data based on the list of emission wavelengths, for each analyte wavelength, determining whether the corresponding spectral peak has a likelihood of being affected by an interference emission wavelength causing spectral interference based on the list of one or more potential interference emission wavelengths corresponding to the analyte wavelength, determining a revised list of one or more analyte wavelengths by removing from the list of analyte wavelengths, analyte wavelengths corresponding to spectral peaks having a likelihood of being affected by an interference emission wavelength, and determining a level of confidence that one or more elements are present in the sample based on a set of criteria applied to the revised list of analyte wavelengths.

18 Claims, 25 Drawing Sheets

(56) References Cited

FOREIGN PATENT DOCUMENTS

| JP | H0267944 A | | 3/1990 | | |
|---|---|---|---|---|---|
| JP | H03269244 A | | 11/1991 | | |
| JP | 2001349829 A | | 12/2001 | | |
| JP | 2007024679 A | | 2/2007 | | |
| JP | 2007333501 A | | 12/2007 | | |
| JP | 2010169412 A | * | 8/2010 | ............ | G01N 21/63 |
| JP | 2011232106 A | | 11/2011 | | |
| JP | 2018136253 A | | 8/2018 | | |

OTHER PUBLICATIONS

Rainer, Neubock et al., "Automated Qualitative Analysis by Inductively Coupled Plasma Atomic Emission Spectrometry Based on a Fuzzy Reasoning Scheme," Microchemical Journal, 45, Jun. 1, 1992, pp. 343-355.

PCT, "Notification of Transmittal of The International Search Report & Written Opinion mailed on Mar. 10, 2020," Application No. PCT/IB2019/061259, 11 pages.

\* cited by examiner

METHOD AND SYSTEM FOR ELEMENT IDENTIFICATION VIA OPTICAL EMISSION SPECTROSCOPY

CROSS-REFERENCE TO RELATED APPLICATIONS

This application is a US national stage entry of PCT/IB2019/061259 filed on 23 Dec. 2019, which claims priority from Australian Application No. 2019903971 filed on 22 Oct. 2019 and from Australian Application No. 2019904107 filed on 31 Oct. 2019, the contents of which are to be taken as incorporated herein by this reference.

TECHNICAL FIELD

The invention relates to a method and system for element identification via optical emission spectroscopy, such as inductively coupled plasma optical emission spectrometry (ICP-OES) (also referred to as inductively coupled plasma atomic emission spectroscopy (ICP-AES)), although the scope of the invention is not necessarily limited thereto.

BACKGROUND OF INVENTION

Spectrometry techniques are used to identify the presence of a target chemical species or analyte, in a sample. Some spectrometry techniques rely on the interaction of the analyte with an excitation source such as light, either in the visible spectrum or at wavelengths that cannot be seen. Depending on the specific spectrometry technique employed, the spectra collected may show the intensity of light absorbed or emitted by a sample after a beam of light interacts with the sample.

In other spectrometry techniques, the excitation source is a plasma source, usually made from argon gas, which provides plasma energy to a nebulised sample causing constituent atoms to be excited and emit light. The emitted light is directed into the spectrometer via the entrance slit or aperture which limits the amount of light entering the system. An optical device disperses light that enters the system to isolate different wavelengths of the emitted spectrum. A detector records multiple wavelength ranges simultaneously to capture the emissions from multiple elements at different parts of the emission spectrum. The detector is typically an integrated array of photosensitive elements that collects the light passing through the spectrometry system. The spatial separation of the individual spectra on the array detector is used to discriminate different wavelengths of light absorbed or emitted by the sample.

Peaks or troughs in the spectral profile of the detected light are indicative of the presence of particular chemical species in the sample. In some spectrometry techniques, quantities or relative amounts of each chemical species can therefore be derived from the spectra.

Traditional methods in ICP-OES typically require a user to specify exactly the elements that they wish to quantitate in any given analytical method. This approach requires the operator to have prior knowledge of which elements are of interest in their sample.

It is often the case that an operator will obtain a list of elements from a pre-existing regulated method, which will include all the elements which were considered as likely to be of interest at the time that method was validated.

This approach has a significant limitation in that operators will not obtain any appreciation for the composition of their samples outside of the elements specified in their method. This can potentially lead to important sample components being overlooked, particularly in samples which are abnormal and may contain components which are very rarely found in samples of the same type.

As an additional level of complexity on top of the requirement for users to specify their elements of interest, existing methods in ICP-OES also require users to specify one or more wavelengths for use in the quantitation of any given element.

Generally, the wavelengths must be specified before an analysis commences. In some cases, the wavelengths can be specified afterwards when a large enough spectral region encompassing many analytical wavelengths is collected during measurement. However, both cases require an experienced user to select wavelengths which are suitable for the samples being analysed.

Selection of a suitable wavelength for quantitation of an element in ICP-OES is complex, and incorrect wavelength selection is a common source of error for this analytical technique. There are several documented effects which may cause any given wavelength to give an incorrect result when quantitating an element via ICP-OES.

Spectral interference and non-spectral interference are two means by which the intensity measured at any given analytical wavelength for an element in a sample solution can be affected and return potentially incorrect results.

Non-spectral interference can occur when components in a sample impact sample introduction or plasma conditions and can result in enhancement or suppression of one or more analytical wavelengths for a given element.

Spectral interferences occur when an analytical wavelength is partially or completely overlapped by an emission from another element or molecule or is otherwise impacted by unstructured background radiation. The presence and magnitude of a spectral interference is highly sample-dependent, even within the same method.

One current method for avoiding spectral interference in a sample is to select analytical wavelengths which are suspected to be free of interference for the samples being analysed. This process is entirely manual and relies on the experience and knowledge of the operator running the instrument. To help ensure that a valid result can be obtained for all samples it is common for an operator to include multiple wavelengths for the same element in their method. However, this method presents the user with multiple results for each element in each sample, and these results must then be interpreted in order to determine which is the most suitable.

Rather than attempting to avoid spectral interferences, some alternative methods rely on correcting for their effects with various calibration techniques such as Inter-Element Correction (IEC).

These methods are well-accepted and can provide reasonably accurate results. However, they rely on the instrument operator to correctly identify the element that is responsible for the interference and then prepare appropriate chemical standards such that the interference correction can be calculated and applied. Accordingly, these current approaches require the operator to have prior knowledge of the interferent elements which are likely to be present in their samples. When the interferent is obscure or uncommon, or the operator is analysing a sample type which they are not familiar with, it can often be very difficult for the operator to predict the presence of the interfering element successfully.

Embodiments of the invention may provide a method and system for element identification via optical emission spectroscopy which overcomes or ameliorates one or more of the disadvantages or problems described above, or which at least provides the consumer with a useful choice.

SUMMARY OF INVENTION

According to one aspect of the invention, there is provided a computer-implemented method of automatically identifying the presence of one or more elements in a sample via optical emission spectroscopy, the method including the steps of obtaining sample spectrum data from the sample, obtaining a list of one or more predetermined emission wavelengths for each element in the periodic table quantifiable by optical emission spectroscopy, each predetermined emission wavelength being associated with a list of one or more potential interference emission wavelengths, determining a list of one or more analyte wavelengths corresponding to spectral peaks in the sample spectrum data based on the list of emission wavelengths, for each analyte wavelength, determining whether the corresponding spectral peak has a likelihood of being affected by an interference emission wavelength causing spectral interference based on the list of one or more potential interference emission wavelengths corresponding to the analyte wavelength, determining a revised list of one or more analyte wavelengths by removing from the list of analyte wavelengths, analyte wavelengths corresponding to spectral peaks having a likelihood of being affected by an interference emission wavelength, and determining a level of confidence that one or more elements are present in the sample based on a set of criteria applied to the revised list of analyte wavelengths.

Advantageously, the revised list of analyte wavelengths are essentially pre-processed to remove those analyte wavelengths that are likely to be prone to spectral interference prior to the step of determine the presence of any elements in the sample. In this manner, the computer implemented method can be used on any uncharacterised sample by an operator without any prior experience or knowledge in the working with the sample or associated instrumentation.

In one embodiment, the sample spectrum data includes data representing emission strength intensities corresponding to wavelengths within a sample spectral range.

The sample spectrum data from the sample may be obtained using any suitable analyser in optical emission spectroscopy. For example, an optical emission spectrometer could be used to obtain the sample spectrum data. In particular, instrumentation for ICP-OES or ICP-AES could be used to obtain the sample spectrum data from the sample.

In one embodiment, the analyser is interfaced with a computer having a processor. The interface may be a wired or wireless connection. The computer processor may include a software application installed thereon for executing one or more of the steps of the computer implemented method. In alternative embodiments, the software application may be a cloud-based application accessible via a network such as the internet. In some embodiments, the software application may be accessible remotely via a local network.

Typically, the list of one or more predetermined emission wavelengths is compiled based on standard emission wavelength measurements for each element conducted for a particular type of analyser, such as instrumentation for ICP-OES.

The list of one or more potential interference emission wavelengths may be determined based on proximity of neighbouring emission wavelengths to each standard emission wavelength (associated with a particular element). The neighbouring emission wavelengths may be associated with a different element to the particular element and cause spectral interference in the intensity measurement for the particular element at the emission wavelength.

The list of one or more predetermined emission wavelengths and associated potential interference emission wavelengths may be stored in a database in computer memory. In some embodiments, the database may be stored remotely and accessible via a network or the internet. The database may be accessible during execution of the software program to carry out the steps of the computer implemented method.

Moreover, the step of determining the list of analyte wavelengths may include analysing a region of interest of the sample spectral range corresponding to each predetermined emission wavelength of each element, and determining whether a peak in the emission strength intensities is located within the region of interest.

Generally, if a peak in the emission strength intensities is located, the emission wavelength corresponding to the located spectral peak for an element in the sample is referred to herein as an analyte wavelength corresponding to the element in the sample.

In particular, the step of determining the list of analyte wavelengths may include analysing a region of interest of the sample spectral range corresponding to each predetermined emission wavelength of each element, determining whether a saturated result is located within the region of interest, and upon determining that a saturated result is not located within the region of interest, determining whether a peak in the emission strength intensities is located within the region of interest.

The saturated result may be associated with an emission strength intensity measurement that exceeds a measurement range of the analyser instrument. Typically, a saturated result may be encountered when spectral interference is present and/or a high concentration of a corresponding element is present in the sample.

The step of determining the list of analyte wavelengths may further include determining whether the saturated result represents a peak in the emission strength intensities having a flat-top.

The step of determining the list of analyte wavelengths may be carried out by the software program installed on a processor using information from the database regarding emission and interference wavelengths.

In addition, the step of determining the list of analyte wavelengths may further include determining a level of confidence that a peak in the emission strength intensities has been identified in the region of interest based on a threshold test.

The level of confidence may be indicated using any suitable means. For example, the level of confidence may be expressed in terms of a confidence factor.

The confidence factor may be expressed in terms of numerical value within a predetermined range.

In some embodiments, determining a level of confidence that a peak in the emission strength intensities has been identified in the region of interest may include calculating a Standard Deviation of emission strength intensities proximate the peak to determine a confidence factor.

The step of determining a level of confidence may be carried out by the software program installed on a processor.

In some embodiments, an element associated with the peak may be attributed as identified if the confidence factor is greater than a predetermined threshold. The predetermined threshold may be calculated based on historical and/or experimental sample data. The predetermined threshold may also be tuned according to a specific type of analyser instrumentation or specific instrumentation, based on experimental data collected using the instrumentation.

In some embodiments, the step of determining whether the corresponding spectral peak of each analyte wavelength has a likelihood of being affected by an interference emission wavelength may include the steps of
- determining a clean interference emission wavelength associated with each analyte wavelength, and
- determining whether the clean interference emission wavelength corresponds to a spectral peak in the sample spectrum data.

The step of determining whether the corresponding spectral peak of each analyte wavelength has a likelihood of being affected by an interference emission wavelength may be carried out by the software program installed on a processor.

A clean or cleanest interference emission wavelength typically refers to an interference emission wavelength out of all potential interference emission wavelengths associated with the analyte wavelength that is least likely to be affected by spectral interference itself. Moreover, the cleanest interference emission wavelength may be a primary emission wavelength associated with a corresponding interference element, and thus capable of providing a clear intensity measurement if the interference element is detected in the sample.

In some embodiments, the step of determining a clean interference emission wavelength may include determining an interference emission wavelength least likely to be affected by spectral interference.

In some embodiments, the method may further include determining, for each analyte wavelength corresponding to a spectral peak being affected by spectral interference, the significance of the spectral interference based on any one or more of
- a distance between a spectral peak corresponding to the clean interference emission wavelength and a spectral peak corresponding to the associated analyte wavelength;
- a ratio of a spectral peak corresponding to the clean interference emission wavelength and a spectral peak corresponding to the associated analyte wavelength; and
- a ratio of an emission strength intensity corresponding to the clean interference emission wavelength and an emission strength intensity corresponding to the associated analyte wavelength.

The emission strength intensity may be predetermined based on Spectral-Line Intensities.

The step of determining the significance of the spectral interference emission wavelength may be carried out by the software program installed on a processor.

In one embodiment, the set of criteria for determining a level of confidence that one or more elements may be present in the sample includes any one or more of
- whether a number of detected primary analyte wavelengths corresponding to each element in the revised list of analyte wavelengths is higher than a first threshold, and
- whether a number of detected primary and secondary analyte wavelengths corresponding to each element in the revised list of analyte wavelengths is higher than a second threshold,
- wherein a primary analyte wavelength for an element corresponds to an emission wavelength having a high peak spectral intensity, and a secondary analyte wavelength for an element corresponds to an emission wavelength having a lower peak spectral intensity than that for a primary analyte wavelength.

The first and second thresholds can be determined based on a desired minimum level of confidence. The desired minimum level of confidence may be determined based on user requirements, industry standards and/or regulatory requirements.

In one embodiment, the first threshold is two for elements having at least three primary analyte wavelengths and one for elements having two or less primary analyte wavelengths, and the second threshold is at least one primary analyte wavelength and one secondary analyte wavelength.

The computer implemented method may further include adding one or more elements to a list of identified elements based on the determined level of confidence. The list of identified elements may be stored in memory of the computer device.

In some embodiments, after execution of the computer implemented method, each analyte wavelength is ranked according to a confidence factor indicating a level of confidence that a corresponding analyte element is present in the sample. For example, an analyte wavelength unlikely to be affected by spectral interference may be given a relatively high confidence factor, whereas an analyte wavelength highly likely to be affected by spectral interference may be given a relatively low confidence factor.

In some embodiments, if a number of detected primary analyte wavelengths corresponding to each element in the revised list of analyte wavelengths is higher than the first threshold, those detected primary analyte wavelengths may be attributed a first confidence factor. The first confidence factor may be a relatively high confidence factor. The corresponding analyte element may also be attributed the first confidence factor.

In addition, if a number of detected primary and secondary analyte wavelengths corresponding to each element in the revised list of analyte wavelengths is higher than a second threshold, those detected primary and secondary analyte wavelengths may be attributed a second confidence factor. The corresponding analyte element may also be attributed the second confidence factor. The second confidence factor being lower than the first confidence factor.

If a number of detected primary analyte wavelengths corresponding to each element in the revised list of analyte wavelengths is lower than the first threshold, and a number of detected primary and secondary analyte wavelengths corresponding to each element in the revised list of analyte wavelengths is lower than a second threshold, those detected primary and secondary analyte wavelengths may be attributed a third confidence factor. The corresponding analyte element may also be attributed the third confidence factor. The third confidence factor being lower than the second confidence factor.

In some embodiments, elements in the list of identified elements are ranked according to their associated confidence factors.

In some embodiments, the computer implemented method may further include validating each element in the list of identified elements to determine whether a spectral peak of the sample spectrum data associated with an analyte wavelength is likely to be affected by an interference emission wavelength causing spectral interference, and upon determining that an analyte wavelength having a corresponding element in the list of identified elements is likely to be affected by an interference emission wavelength causing spectral interference, removing the corresponding element from the list of identified elements.

The step of validating each element may be carried out by the software program installed on a processor.

Advantageously, the step of validating of each element provides an opportunity for each element in the list of identified elements to be re-assessed so that any elements that were potentially incorrectly attributed as found in the sample and added to the list of identified elements to be removed.

The computer implemented method may further include selectively displaying analyte wavelengths corresponding to each element in the list of identified elements based on selection criteria. The selection criteria may include any one or more of whether the analyte wavelength is associated with a saturated result, a maximum number of analyte wavelengths to display for each corresponding element, and whether an analyte wavelength is associated with a user selection.

The computer implemented method may further include calculating a concentration of each element in the list of identified elements. The step of calculating the concentration of each element may include measuring an emission strength intensity of a spectral peak associated with the corresponding element and correcting for background emission.

The computer implemented method may further include identifying outlier analyte wavelengths, and reducing the level of confidence that a corresponding element is present in the sample based on a measurement associated with the outlier analyte wavelength. In some embodiments, the level of confidence that a corresponding element is present in the sample is inferred based on the level of confidence that an analyte wavelength associated with the element is detected.

According to another aspect of the invention, there is provided a system for automatically identifying the presence of one or more elements in a sample via optical emission spectroscopy, the system including for obtaining sample spectrum data from the sample, and a processor for performing a computer-implemented method as described in the herein.

According to further aspect of the invention, there is provided one or more tangible non-transitory computer-readable media having computer-executable instructions for performing a computer-implemented method as described herein.

According to yet another aspect of the invention, there is provided a computer system for automatically identifying the presence of one or more elements in a sample via optical emission spectroscopy, the system including a sample data retrieving module for obtaining sample spectrum data from the sample, a wavelength data retrieving module for obtaining a list of one or more predetermined emission wavelengths for each element in the periodic table quantifiable by optical emission spectroscopy, each predetermined emission wavelength being associated with a list of one or more potential interference emission wavelengths, a peak search module for determining a list of one or more analyte wavelengths corresponding to spectral peaks in the sample spectrum data based on the list of emission wavelengths, an interference search module for determining, for each analyte wavelength, whether the corresponding spectral peak has a likelihood of being affected by an interference emission wavelength causing spectral interference based on the list of one or more potential interference emission wavelengths corresponding to the analyte wavelength, a wavelength processing module for determining a revised list of one or more analyte wavelengths by removing from the list of analyte wavelengths, analyte wavelengths corresponding to spectral peaks having a likelihood of being affected by an interference emission wavelength, and an element identification module for determining a level of confidence that one or more elements are present in the sample based on a set of criteria applied to the revised list of analyte wavelengths.

The sample data retrieving module may interface with an optical emission spectrometer to obtain sample spectrum data from the sample.

The wavelength data retrieving module may retrieve wavelength data from a database.

The peak search module may be configured to analyse a region of interest of the sample spectral range corresponding to each predetermined emission wavelength of each element, determine whether a saturated result is located within the region of interest, and upon determining that a saturated result is not located within the region of interest, determine whether a peak in the emission strength intensities is located within the region of interest.

The peak search module may be further configured to determine whether the saturated result represents a peak in the emission strength intensities having a flat-top.

The peak search module may be further configured to determine a level of confidence that a peak in the emission strength intensities has been identified in the region of interest based on a threshold test. Determining a level of confidence that a peak in the emission strength intensities has been identified in the region of interest may include calculating a Standard Deviation of emission strength intensities proximate the peak to determine a confidence factor.

The interference search module may be further configured to determine a clean interference emission wavelength associated with each analyte wavelength, and determine whether the clean interference emission wavelength corresponds to a spectral peak in the sample spectrum data.

The computer system may be further configured to determine, for each analyte wavelength corresponding to a spectral peak being affected by spectral interference, the significance of the spectral interference based on any one or more of a distance between a spectral peak corresponding to the clean interference emission wavelength and a spectral peak corresponding to the associated analyte wavelength;

a ratio of a spectral peak corresponding to the clean interference emission wavelength and a spectral peak corresponding to the associated analyte wavelength; and a ratio of an emission strength intensity corresponding to the clean interference emission wavelength and an emission strength intensity corresponding to the associated analyte wavelength.

The element identification module may be configured to determine a level of confidence that one or more elements are present in the sample based on any one or more of the following whether a number of detected primary analyte wavelengths corresponding to each element in the revised list of analyte wavelengths is higher than a first threshold, and whether a number of detected primary and secondary analyte wavelengths corresponding to each element in the revised list of analyte wavelengths is higher than a second threshold, wherein a primary analyte wavelength for an element corresponds to an emission wavelength having a high peak spectral intensity, and a secondary analyte wavelength for an element corresponds to an emission wavelength having a lower peak spectral intensity than that for a primary analyte wavelength.

The element identification module may be configured to add one or more elements to a list of identified elements based on the determined level of confidence.

The computer system may further include a validation module for validating each element in the list of identified elements to determine whether a spectral peak of the sample spectrum data associated with the respective element is likely to be affected by an interference emission wavelength causing spectral interference, and upon determining that an element in the list of identified elements is likely to be affected by an interference emission wavelength causing spectral interference, removing the corresponding element from the list of identified elements.

The computer system may further include a results selection module for selectively displaying analyte wavelengths corresponding to each element in the list of identified elements based on selection criteria, wherein the selection criteria includes any one or more of whether the analyte wavelength is associated with a saturated result, a maximum number of analyte wavelengths to display for each corresponding element, and whether an analyte wavelength is associated with a user selection.

The computer system may further include a concentration calculation module for calculating a concentration of each element in the list of identified elements. Calculating the concentration of each element may include measuring an emission strength intensity of a spectral peak associated with the corresponding element and correcting for background emission.

The computer system may further include an outlier check module for identifying outlier analyte wavelengths, and reducing the level of confidence that a corresponding element is present in the sample based on a measurement associated with the outlier analyte wavelength.

Advantageously, embodiments of the present invention automatically identify element emission wavelengths in uncharacterized solutions to identify all elements available to the ICP-OES technique that may be present, without any requirement for preselection of element emission wavelengths by an operator.

In order that the invention may be more readily understood and put into practice, one or more preferred embodiments thereof will now be described, by way of example only, with reference to the accompanying drawings.

BRIEF DESCRIPTION OF DRAWINGS

FIG. 1a further illustrates a process flow diagram summarising the process steps of a computer-implemented method for element identification according to one embodiment of the invention.

FIG. 1b illustrates display information relating to background emission correction and concentration calculation in the computer-implemented method of FIG. 1a.

FIG. 2a is a process flow diagram illustrating a data acquisition subprocess of the computer-implemented method shown in FIG. 1a.

FIG. 2b is a process flow diagram illustrating a data loading subprocess of the computer-implemented method shown in FIG. 1a.

FIG. 3 is a process flow diagram illustrating the Element Search process of the computer-implemented method shown in FIG. 1a.

FIG. 5a illustrates display information relating to concentration results determined based on the method shown in FIG. 1a for some of the identified elements for samples 1 to 10 according to an example embodiment of the invention.

FIG. 5b illustrates display information relating to further results including analyte wavelengths, corresponding confidence ratings and graphical representation of spectral data for an analyte wavelength of element Lithium (Li) in sample 1 as shown in FIG. 5a.

FIG. 5c illustrates display information relating to concentration results determined based on the method shown in FIG. 1a for some of the identified elements for samples 1 to 10 according to an example embodiment of the invention.

FIG. 7a illustrates display information relating to concentration results determined based on the method shown in FIG. 1a for some of the identified elements for samples 1 to 10 according to an example embodiment of the invention.

FIG. 7b illustrates display information relating to further results including analyte wavelengths, corresponding confidence ratings and graphical representation of spectral data for analyte wavelengths in sample 5 as shown in FIG. 7a.

FIG. 9 is a process flow diagram illustrating a process for validating and re-assessing the presence of spectral interference in the method shown in FIG. 1a.

FIG. 10 is a process flow diagram illustrating a process for selectively determining accepted analyte wavelengths for display in the method shown in FIG. 1a.

FIG. 11 is a process flow diagram illustrating a process for determining outlier results in the method shown in FIG. 1a.

FIG. 12 is a process flow diagram illustrating a process for selecting the best available results for display in the method shown in FIG. 1a.

FIG. 14 is an extract from a user interface of the system according to one embodiment of the invention illustrating the automatic identification of several common and problematic spectral interferences on wavelengths for As, Mn and V in an HJ 781-2016 solid waste digest.

FIG. 15 is an extract from a user interface of the system according to one embodiment of the invention illustrating the absence of any detected Cl in "Soil 4" due to technician inattention when adding acids before digestion, and the absence of Sb in "Soil 4". This has likely not been solubilized in this sample as a result of the lack of HCl in the digest.

FIGS. 16a and 16b are extracts from a user interface of the system according to one embodiment of the invention, comparing a periodic table heatmap-style visualisation for multiple samples. In this embodiment, concentration-based colour-coding may provide a visually intuitive way to identify differences between measured solutions.

DETAILED DESCRIPTION

Figure 1A:
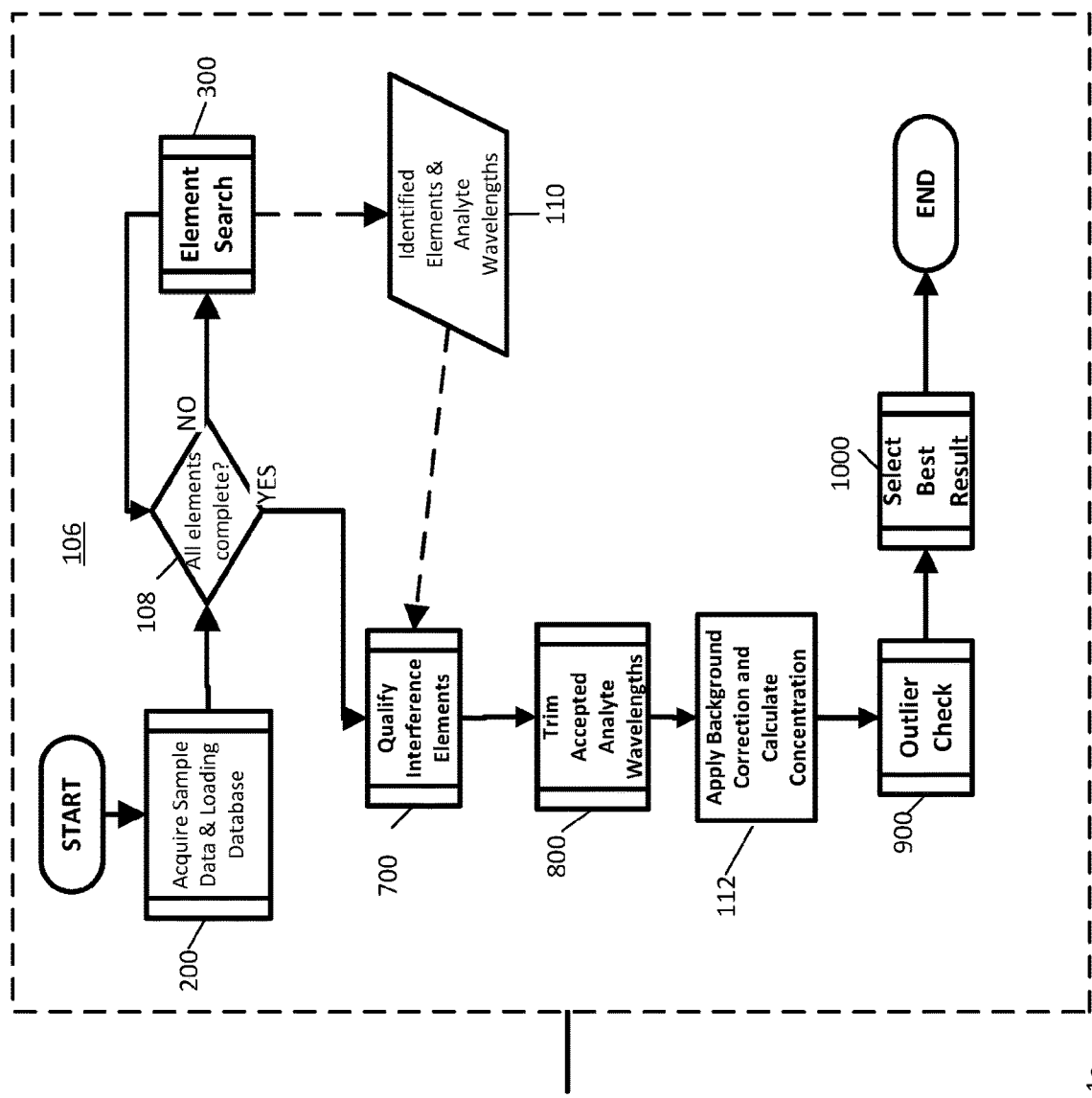
FIG. 1a is a schematic diagram illustrating a system for element identification using optical emission spectroscopy according to one embodiment of the invention.
Figure 1A:
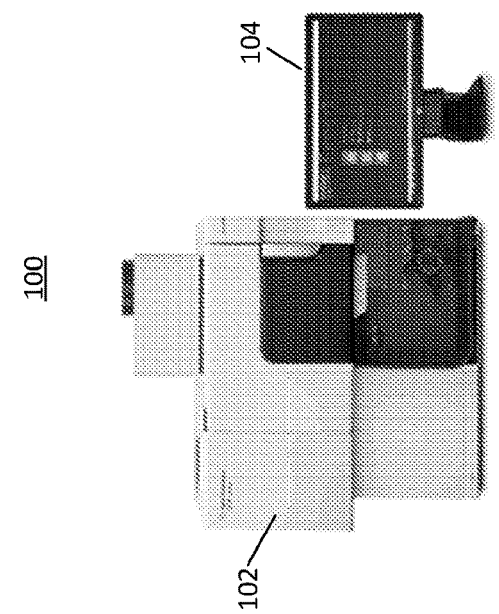

As illustrated in FIG. 1a, a system 100 for automatically identifying the presence of one or more elements in a sample via optical emission spectroscopy includes an optical emission spectrometer 102 such as an Inductively Coupled Plasma Optical Emission Spectrometry (ICP-OES) instrument, also referred to as Inductively Coupled Plasma Atomic Emission Spectroscopy (ICP-AES). The ICP-OES instrument 102 obtains spectral data from one or more samples for analysis. The system 100 further includes a processor (not shown) having an application installed thereon for executing a software implemented method 106 of analysing the sample spectrum data obtained from the instrument 102 and identifying with a level of confidence, the presence of one or more elements in the sample. In some cases, if elements within a sample are below detection levels, the instrument 102 may not identify the presence of any elements. A display device 104 is coupled to the processor for providing a user interface to facilitate user interaction with the system 100 and displaying output from the sample analysis.

The computer implemented method 106 obtains sample spectrum data from one or more uncharacterised sample solutions loaded into the instrument 102, and automatically analyses the samples to identify the presence of one or more elements in each sample in a series of functional steps as described in further detail below. The method 106 is described with respect to a single sample. However, it is understood that the method 106 is not limited to analysing a single sample and is capable of handling any suitable number of samples.

At initiating step 200, sample spectrum data is acquired from a sample solution loaded into instrument 102 and theoretical emission wavelength data is loaded from a data repository. The data repository provides a list of all elements in the periodic table quantifiable by optical emission spectroscopy (also referred to herein as the Elements List) and theoretical emissions wavelength data for each element in the Element List. The theoretical emissions wavelength data may be manually compiled based on measurement of standard samples, and/or based on standard data such as those from the Atomic Spectra Database published by the National Institute of Standards and Technology (NIST). In particular, the theoretical emission wavelength data includes standard emission wavelengths for each element in the Element List, and potential interference wavelength data associated with each standard emission wavelength. Further detail regarding step initiating step 200 will be described in further detail below with reference to FIGS. 2a to 2c.

At query step 108, the method 106 checks whether the Element Search process 300 has executed for each element in the Element List with respect to a sample solution under analysis. If so, the method 106 proceeds to execute process 700. If not, the method 106 proceeds to execute the process 300 for the next element in the Element List.

In summary, process 300 compares the theoretical emissions wavelength data against sample spectrum data from the sample solution to determine a list of analyte wavelengths likely to be without spectral interference which correspond to spectral peaks in the sample spectrum data. The process 300 then further determines with a level of confidence that one or more elements are present in the sample by assessing the list of analyte wavelengths against predetermined criteria. The process 300 generates a list of elements likely to be present in the sample based on the predetermined criteria and a list of analyte wavelengths used to identify those elements (List of Identified Elements and Analyte Wavelengths 110). Process 300 is an iterative process which is applied to each element in the Element List. The process 300 is described in further detail with reference to FIG. 3.

Figure 9:
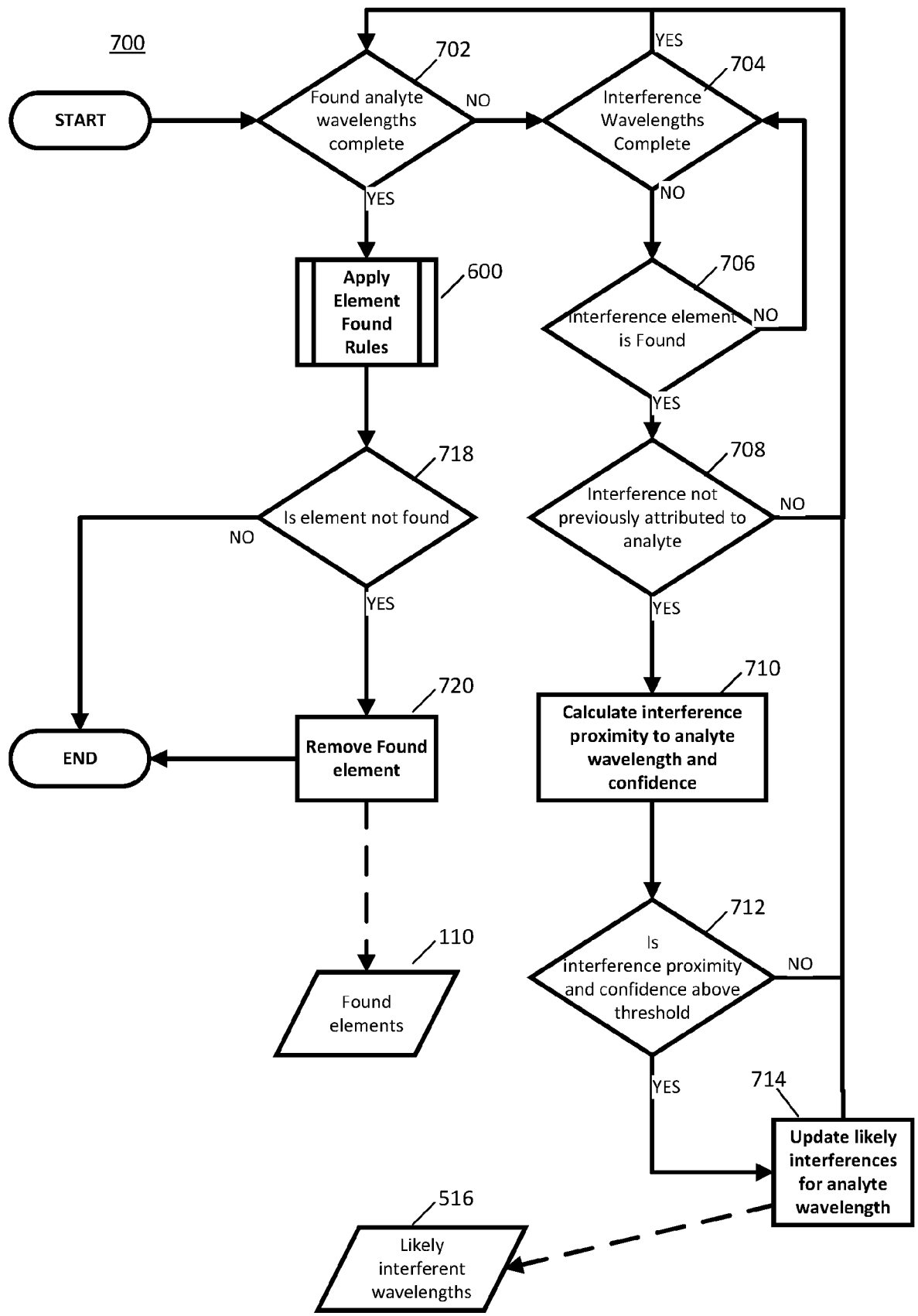

At process 700, the method 106 validates and re-evaluates the List of Identified Elements and Analyte Wavelengths 110 to determine any further spectral interference. Any analyte wavelengths from the list 110 determined to be affected by spectral interference are removed from the list 110 and/or given a low confidence rating. The process 700 is described in further detail below with reference to FIG. 9.

At process step 800, the method 106 further assesses the List of Identified Elements and Analyte Wavelengths 110 and selects most suitable analyte wavelengths for each element in the list 110 for display on the display device 104.

At step 112, for each of analyte wavelength in the List 110, a background emissions correction is applied to determine the net spectral peak intensity associated with the analyte wavelength. Any standard ICP-OES background correction technique may be used. For example, Fitted Background Correction technique may be used due to its robustness. In step 112, for each analyte wavelength in the List 110, a semi-quantitative concentration for the associated element is calculated using predetermined intensity to concentration calibration curves. Any standard ICP-OES calibration curves may be used, for example the calibration curve may be Linear or Quadratic.

Figure 1B:
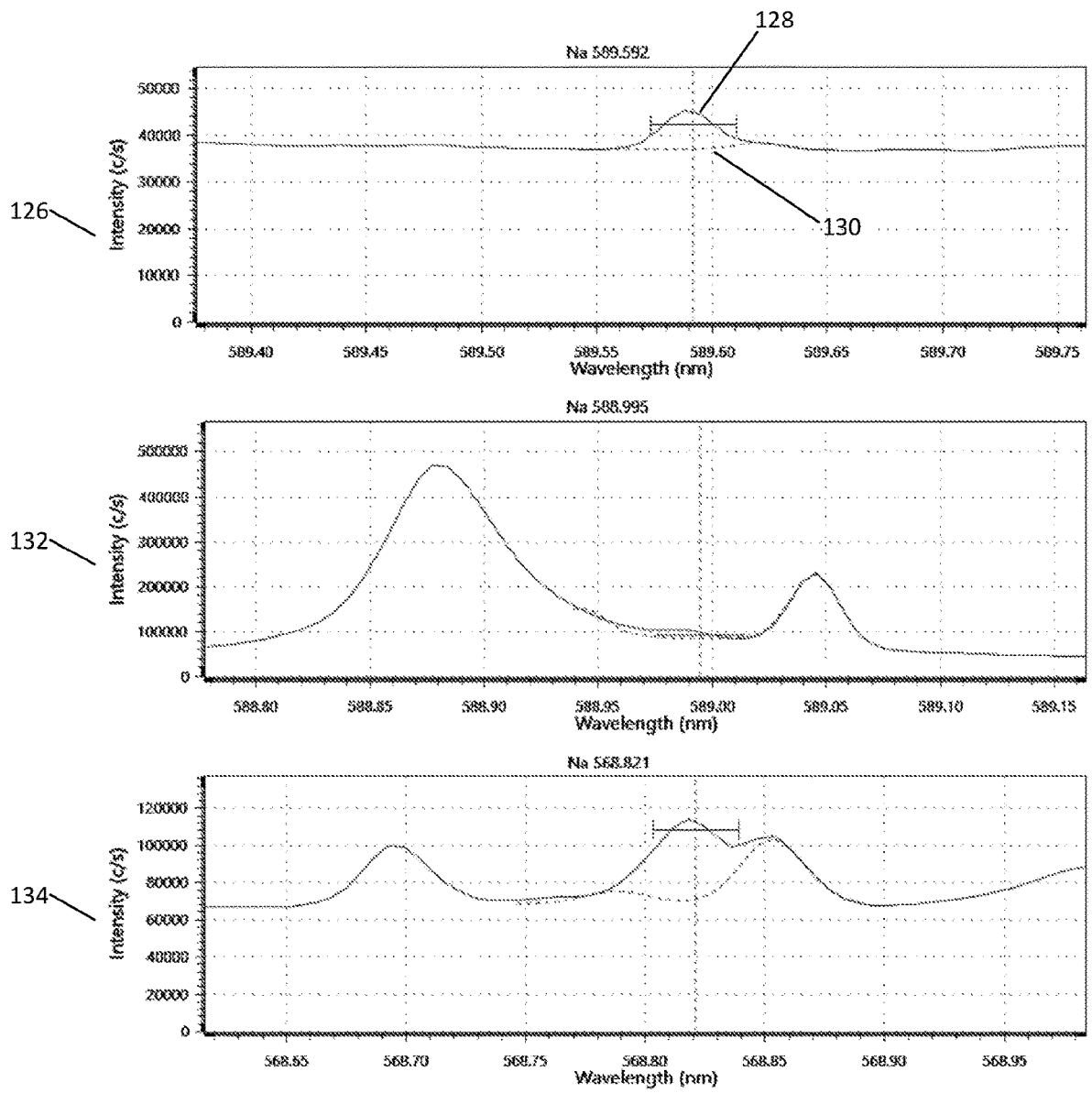

For example, as illustrated in FIG. 1b the display information generated by the method 106 includes a list of analyte wavelengths associated with element Sodium (Na) identified in a sample. A first analyte wavelength 116 of 589.892 nm for Na has a confidence rating 118 of 3 stars, a calculated concentration of 0.51 mg/L, intensity of 7874.7 c/s and background emission of 36933.7 c/s.

Graph 126 of FIG. 1b is a plot of Intensity vs Wavelength and illustrates the spectral peak 128 in the sample spectrum data for Na analyte wavelength 589.892 nm against an estimation for background emission 130.

Similarly, graphs 132 and 134 illustrates the portion of the sample spectrum data associated with Na analyte wavelength 588.995 nm and 568.821 nm respectively.

Now referring to FIG. 1a, at process step 900, the method 106 undertakes an assessment of the analyte wavelengths in the List 110 for possible outlier results per element and adjusts the confidence rating associated with the respective analyte wavelength. The process 900 is described in further detail with reference to FIG. 11.

At process step 1000, the method 106 applies weighting to the analyte wavelengths in the List 110 based on weighting criteria to identify the most suitable results for display. The process 900 is described in further detail with reference to FIG. 12.

Figure 2B:
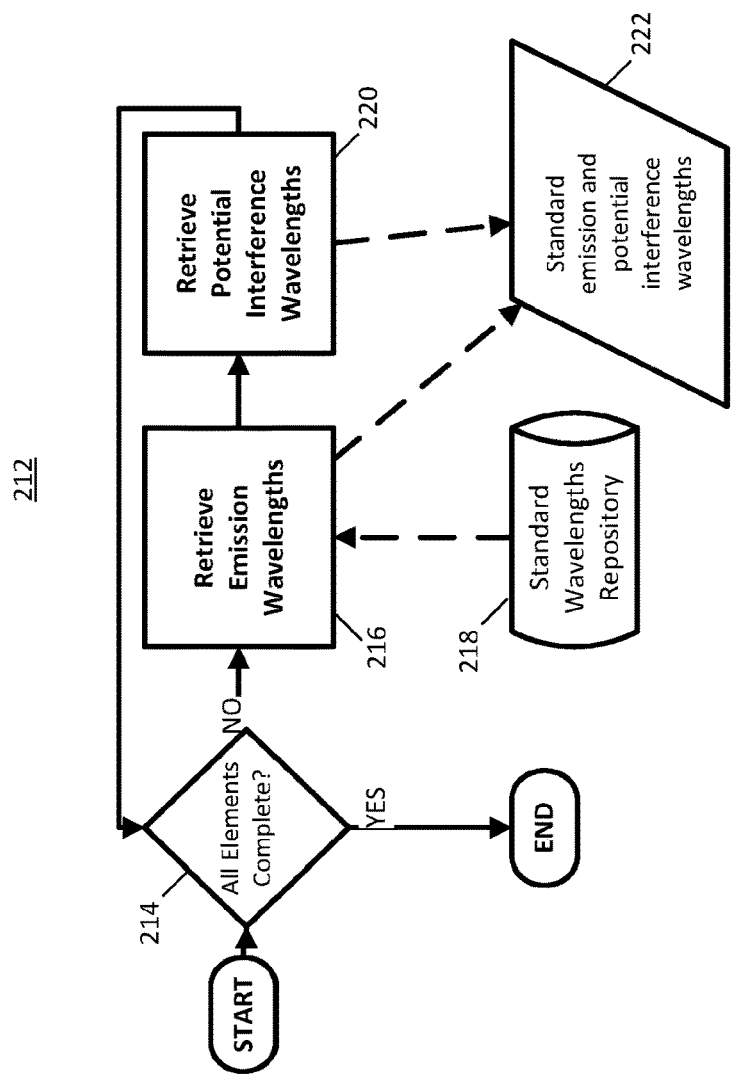
Figure 2A:
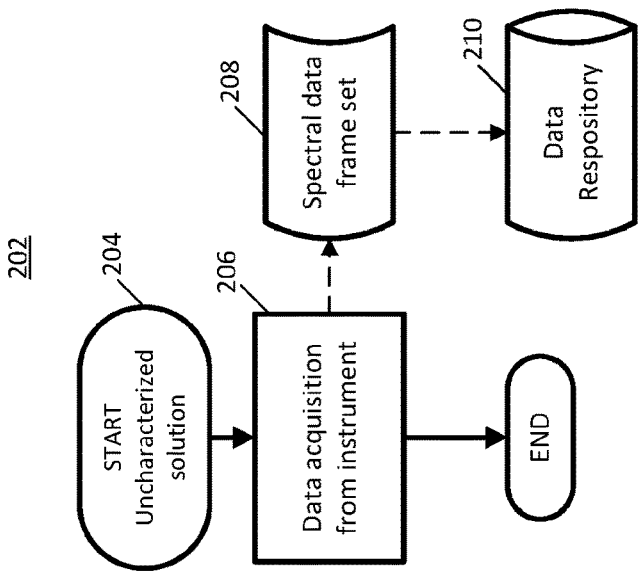

Now referring to FIGS. 2a and 2b, which illustrate subprocesses 202, 212 relating to the sample data acquisition and database loading step 200 of method 106.

During subprocess 202, sample spectrum data is obtained from an uncharacterised sample solution using instrument 102.

At initiation step 204, an uncharacterised sample solution is loaded into the instrument 102. Whilst the present specification describes the process with respect to a single sample solution, a person skilled in the art will understand that the instrument is typically configured to retrieve spectral data from multiple sample solutions sequentially.

At step 206, the instrument 102 obtains spectral sample data from the uncharacterised sample solution. The spectral sample data provides measured intensities for wavelengths across the spectrum of the sample. Typically, the sample spectrum data will consist of many data points that cover both broad wavelength and signal strength ranges.

Output 208 from step 206 is saved in data repository 210 of the system 100 for use in the method 106 and referred to herein as Sample spectrum data.

During subprocess 212, standard atomic emission wavelength data is loaded from a data repository 218 for use during execution of method 106.

At query step 214, the subprocess 212 checks whether the standard atomic emission wavelength data is retrieved for all elements in the Elements List. If so, the subprocess 212 is complete, if not, the subprocess 212 proceeds to step 216 for each remaining element. Subprocess 212 is an interactive process and the steps described below are applied to each element in the Elements List until all relevant emission wavelength data is loaded for all elements in the Elements List.

At step 216, the subprocess 212 retrieves the top ten primary order element emission wavelengths from data repository 218 and stores the emission wavelengths in a list 222.

At step 220, for each emission wavelength retrieved in step 216, the subprocess 212 retrieves a list of potential interference emission wavelengths associated with the emission wavelength from data repository 218, and also stores the list of potential interference emission wavelengths in the list 222.

Standard Emission Wavelengths and Interference Emission Wavelengths List 222 may be generated in any suitable structure or form, such as a lookup table, containing a list of top 10 emission wavelengths for each element in the Elements List and a set of potential interference emission wavelengths for each emission wavelength.

Figure 2C:
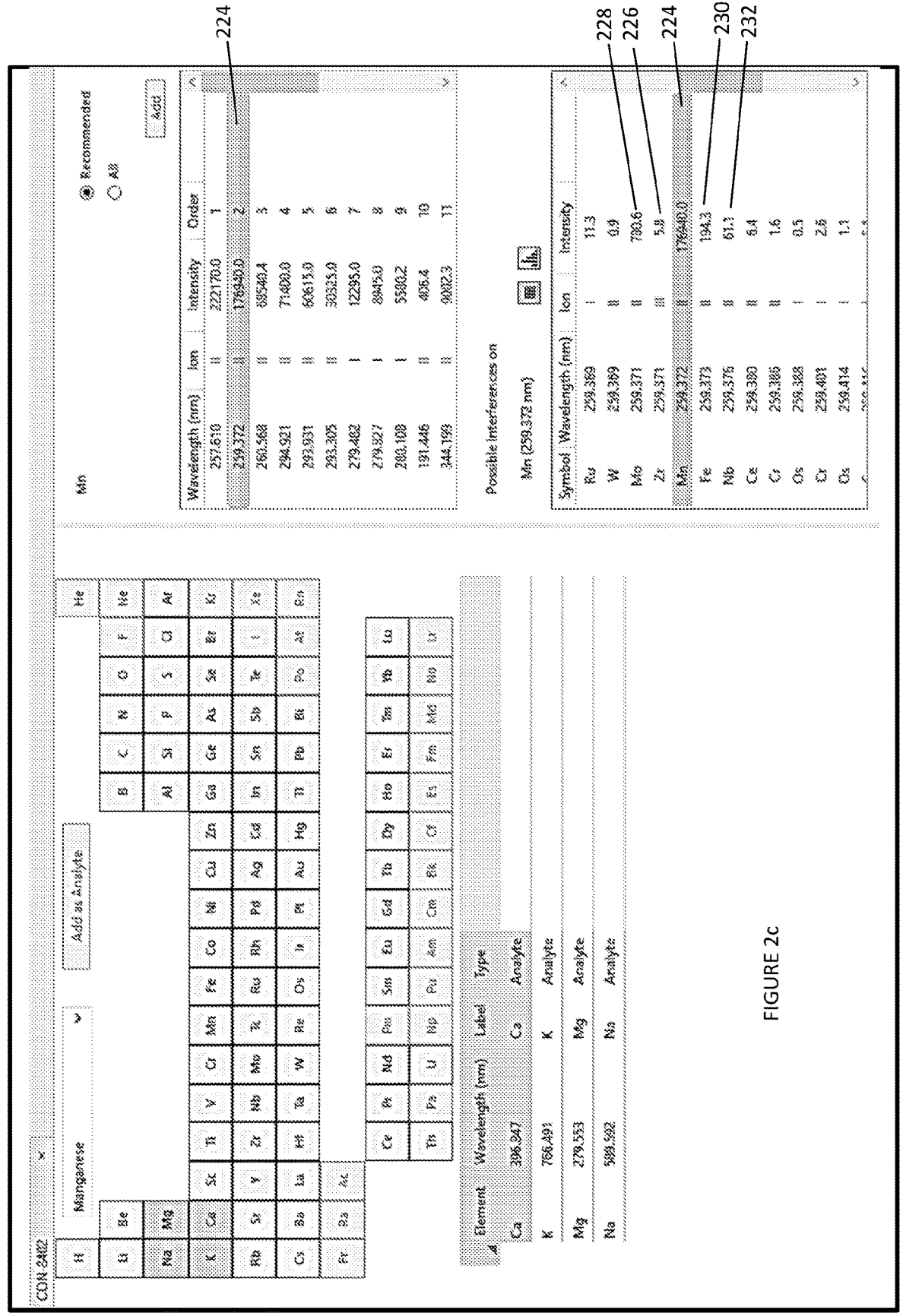
FIG. 2c illustrates display information relating to standard emission wavelength data and associated potential interference emission wavelength data provided by the subprocess shown in FIG. 2b.

The display information in FIG. 2c illustrates information available from data repository 218. For example, for an element in the Elements List, such as Manganese (Mn), a second order emission wavelength 224 of 259.372 nm may encounter spectral interference from neighbouring emission wavelengths for Zirconium (Zr) 226 at 259.371 nm, Molybdenum (Mo) 228 at 259.371 nm, Iron (Fe) 230 at 259.373 nm, Niobium (Nb) 232 at 259.376 nm and so forth.

Figure 3:
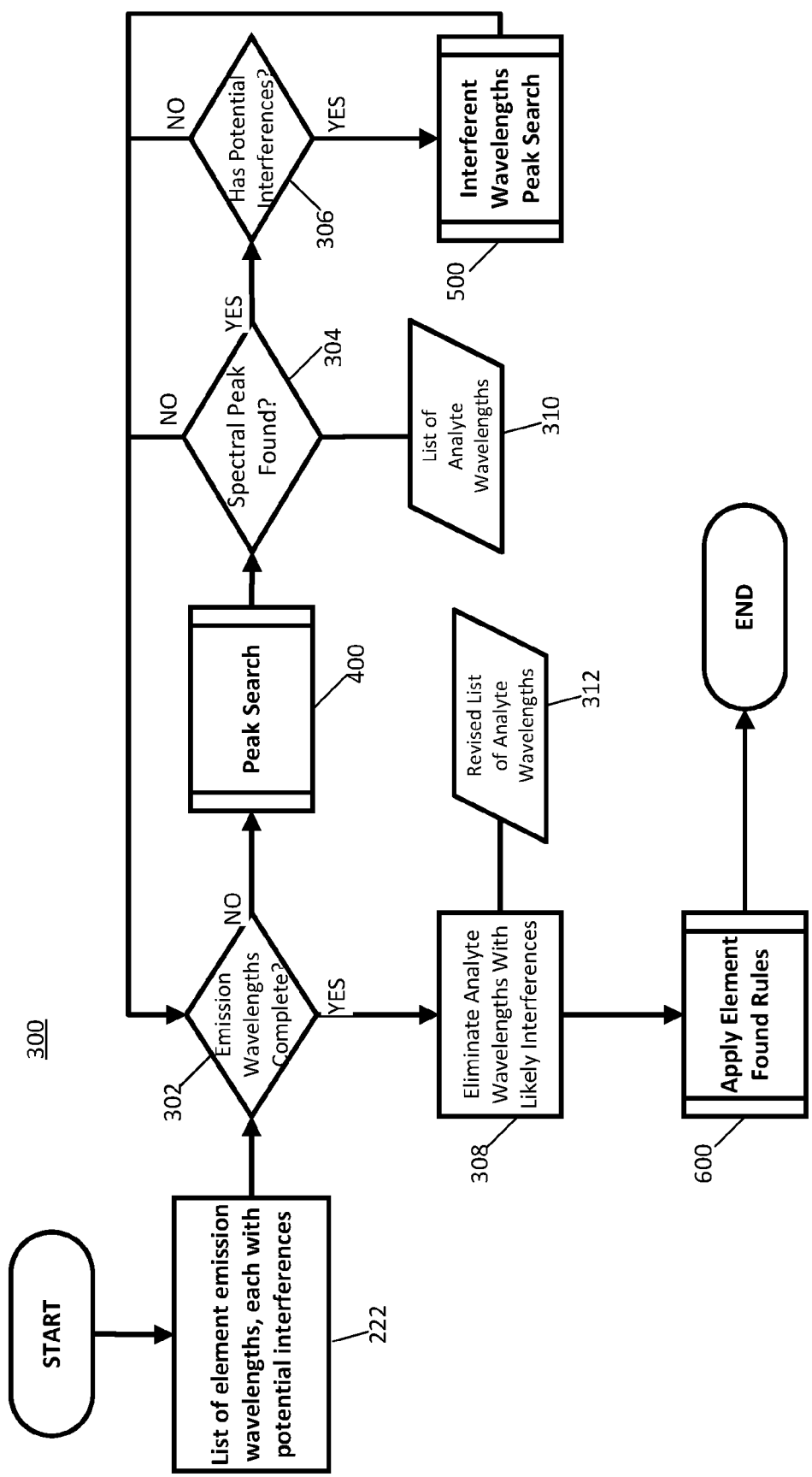

The Element Search process 300 of method 106 will now be described with reference to FIG. 3. The process 300 uses data from the Standard Emission Wavelengths and Interference Emission Wavelengths List 222 loaded in subprocess 212.

At query step 302, the process 300 checks whether the relevant process steps 400 to 500 for identifying spectral peaks and interference has been applied to each emission wavelength from the List 222. If so, the process 300 proceeds to step 308. If not, the process 300 proceeds to subprocess 400 for identifying spectral peaks in the sample spectrum data. Query step 302 iterates through each emission wavelength from the list 222 until all emission wavelengths in the list 222 have been processed. Subprocess 400 will be explained in further detail below with reference to FIGS. 4, 5a and 5d.

At query step 304, if a respective spectral peak in the sample spectrum data has been identified with at least a certain level of confidence, the process 300 proceeds to query step 306. If a spectral peak has been found, the corresponding emission wavelength is referred to herein as an analyte wavelength. A list of analyte wavelengths is compiled in a List of Analyte Wavelengths 310. If not, the process 300 returns to query step 302 to locate the next emission wavelength in the list 222 for analysis.

At query step 306, the process 300 determines whether the respective analyte wavelength is associated with a set of potential interference emission wavelengths based on data from list 222. If so, the process 300 proceeds to subprocess 500 to identify spectral peaks for the interference emission wavelengths in the sample spectrum data. If not, the process returns to query step 302 to locate the next emission wavelength in the list 222 for analysis. Subprocess 500 will be explained in further detail below with reference to FIGS. 6, 7a and 7d.

At step 308, as a result of process steps 400 to 500, those analyte wavelengths identified to be associated with spectral peaks likely to be affected by spectral interference are removed from the List 310. Consequently, the List 310 is revised to omit analyte wavelengths corresponding to spectral peaks determined to have a high chance of being affected by spectral interference (referred to herein as Revised List of Analyte Wavelengths 312).

At subprocess 600, a set of rules are applied to the Revised List 312 of analyte wavelengths to determine with a certain level of confidence that one or more elements are present in the sample. Subprocess 600 will be explained in further detail below with reference to FIG. 8. The Revised List 312 may include a plurality of sub-lists. Each sub-list including a list of analyte wavelengths associated with a particular element.

Subprocess 400 for identifying spectral peaks for each analyte wavelength to compile List 310 will now be described with reference to FIG. 4.

At step 402, sample spectrum data from data repository 210 is used for analysis. Subprocess 400 determines a relevant region of the sample spectrum data corresponding to the respective analyte wavelength and sets the relevant region as a Region of Interest for the respective analyte wavelength.

At step 404, the subprocess 400 conducts a constrained search within the Region of Interest to locate a relevant summit portion for the respective analyte wavelength. The search is constrained to prevent incorrectly locating an incorrect summit portion associated with a neighbouring spectral peak.

At query step 406, the subprocess 400 determines whether a saturated intensity result is located within the Region of Interest by determining whether there is a substantially flat portion at an upper end of a spectral peak. A saturated result includes an intensity measurement which exceeds the measurable range of the instrument 102. If a substantially flat portion is located, the subprocess 400 proceeds to step 408, and if not the subprocess 400 proceeds to 412.

Figure 5A:
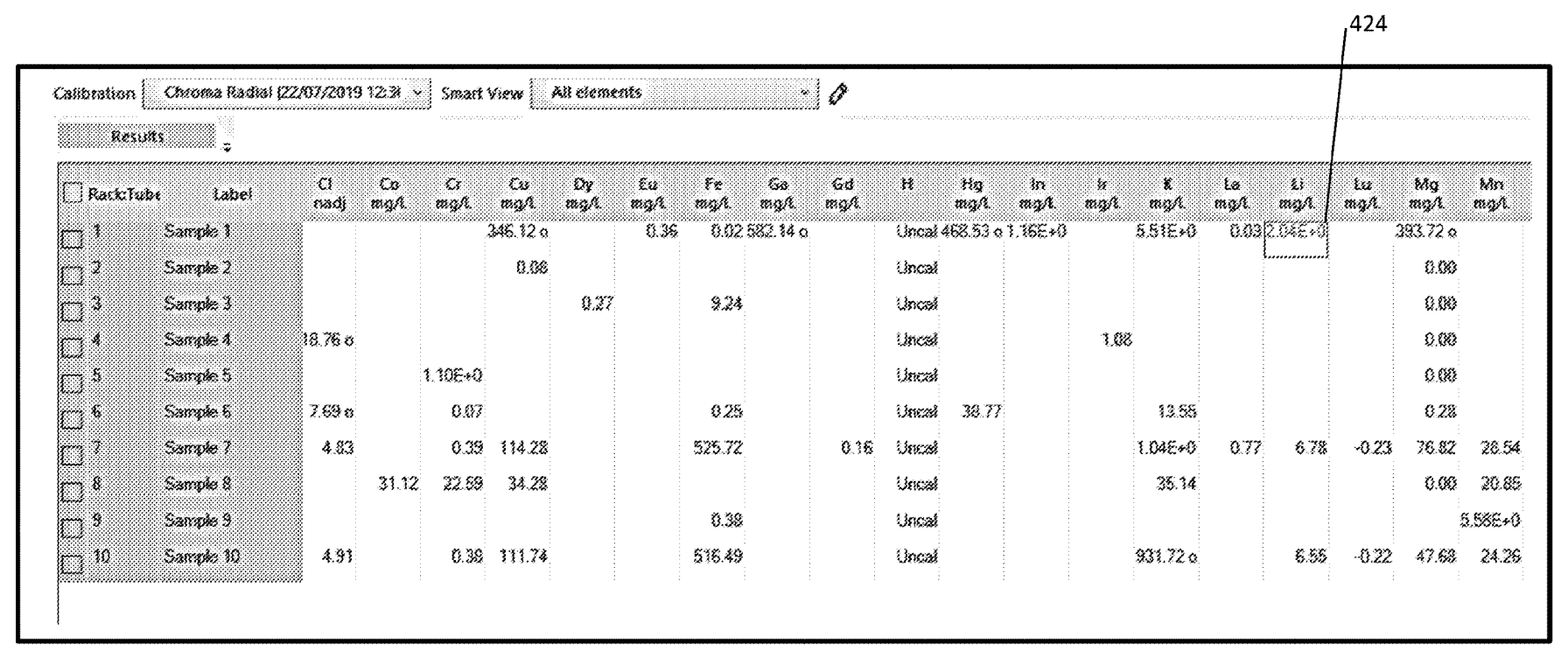
Figure 5B:
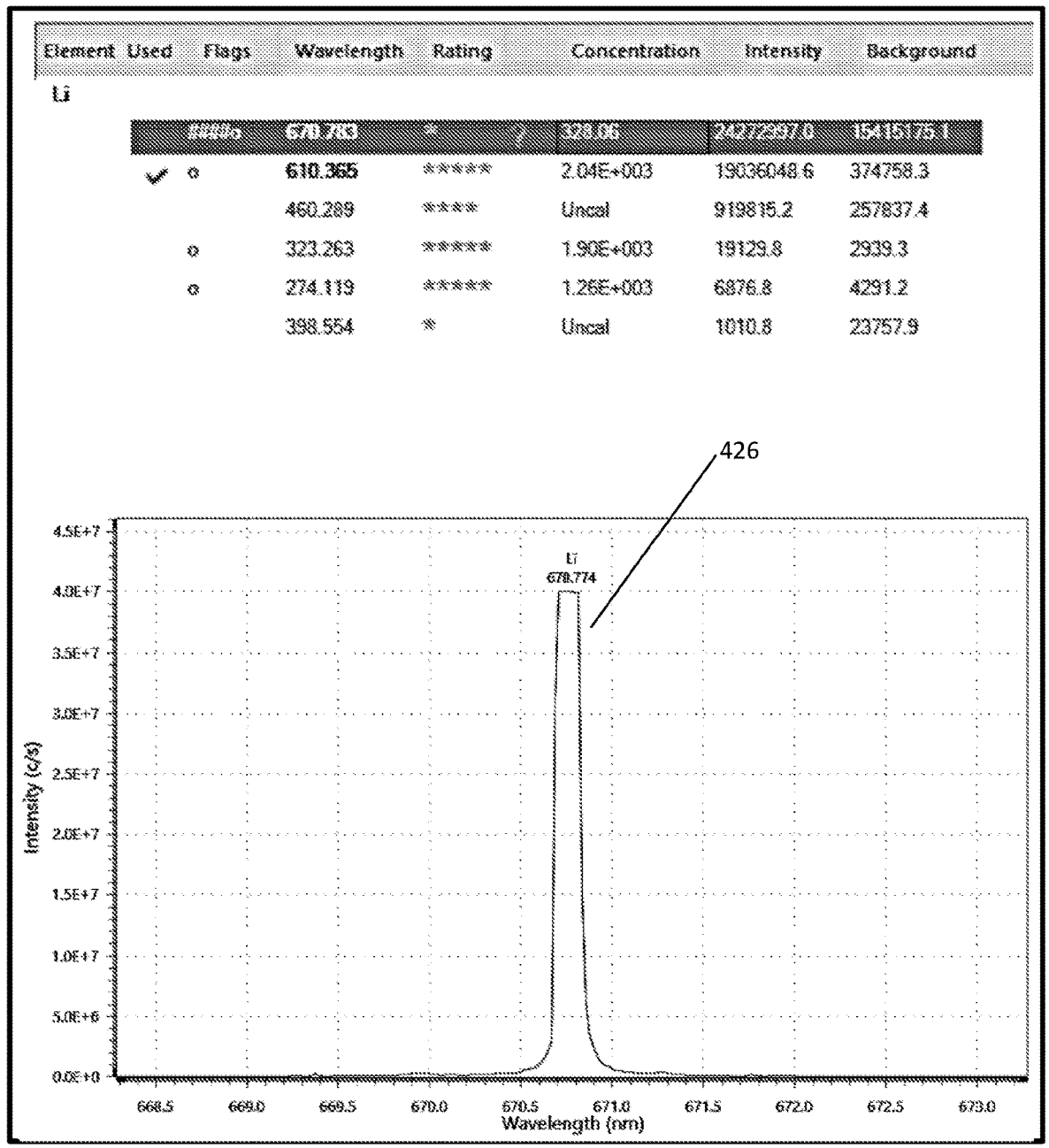

At step 408, the subprocess 400 assesses whether the located peak having a substantially flat portion resembles a flattop peak for the respective analyte wavelength (e.g. see FIG. 5B).

At query step 410, if a flattop peak is located in step 408, the subprocess 400 proceeds to step 416. If not, the subprocess 400 for the respective analyte wavelength ends and an output indicating that no spectral peak was located corresponding to the analyte wavelength is provided for input to step 304 of process 300.

At step 416, the subprocess 400 determines that a spectral peak associated with the analyte wavelength has been found. However, due to difficulties in accurately determining flattop spectral peaks and saturated intensity results, a confidence rating indicating a level of confidence that a spectral peak corresponding to the analyte wavelength has been identified is given a low score. An output indicating that a spectral peak has been located corresponding to the analyte wavelength is provided for input to step 304 of process 300.

At step 412, the subprocess 400 assesses the Region of Interest in the sample spectrum data for a regular spectral peak (e.g. not a saturated result or flattop peak). It is possible that more than one spectral peak is present in the Region of Interest.

At step 414, the subprocess 400 determines a suitable local background position based on the summit portion located in step 404 to calculate background Standard Deviation in step 420.

At query step 418, if step 414 determines that a spectral peak is present in the relevant summit portion, the subprocess 400 proceeds to step 420. If not, the subprocess 400 ends. An output indicating that no spectral peak was located corresponding to the respective analyte wavelength is provided for input to step 304 of process 300.

At step 420, a constrained search for local background measurements is performed near the spectral peak apex position. An interpolation of the background points allows the net peak intensity at the spectral peak apex position to be determined. A Standard Deviation (SD) is calculated for the local background measurements to the spectral peak. The local background with the greatest SD is selected.

At step 422, with a valid background SD, a confidence factor based on a signal to noise ratio is assigned to the spectral peak and is calculated as follows:

$$\text{confidence factor} = \frac{\text{net peak intensity}}{(\text{background } SD) \times BG \text{ threshold}}$$

Wherein BGthreshold is a scalar typically in the range 1 to 10.

A spectral peak corresponding to a respective analyte wavelength is considered to be detected if the confidence factor passes a threshold test, for example:

confidence factor>Cthreshold

Where Cthreshold is a scalar typically in the range 1 to 10.

If there is no valid background SD, an interpolated background value at the peak apex position is substituted and a signal to background ratio calculated rather than a signal to noise ratio.

Whilst the subprocess 400 above is described with reference to one example methodology of spectral peak detection, it is to be understood that any suitable peak detection algorithm may be implemented. Some suitable example peak detection algorithms may include but are not limited to window threshold method, derivative analysis and wavelet transforms.

At the completion of step 422, an output indicating that a spectral peak has been located corresponding to the respective analyte wavelength is provided for input to step 304 of process 300.

The display information in FIGS. 5a and 5b provides an example of a flattop spectral peak associated with an analyte wavelength for Lithium (Li). As shown in FIG. 5a the intensity for element Li in Sample 1 is 2.4E+0 mg/L (424). FIG. 5b illustrates that analyte wavelength 670.783 nm for Li is given a 1 star rating (reflecting a low confidence factor) due to the identification of the flattop spectral peak 426 at 670.774 nm proximate the analyte wavelength of 670.783 nm.

Figure 5C:
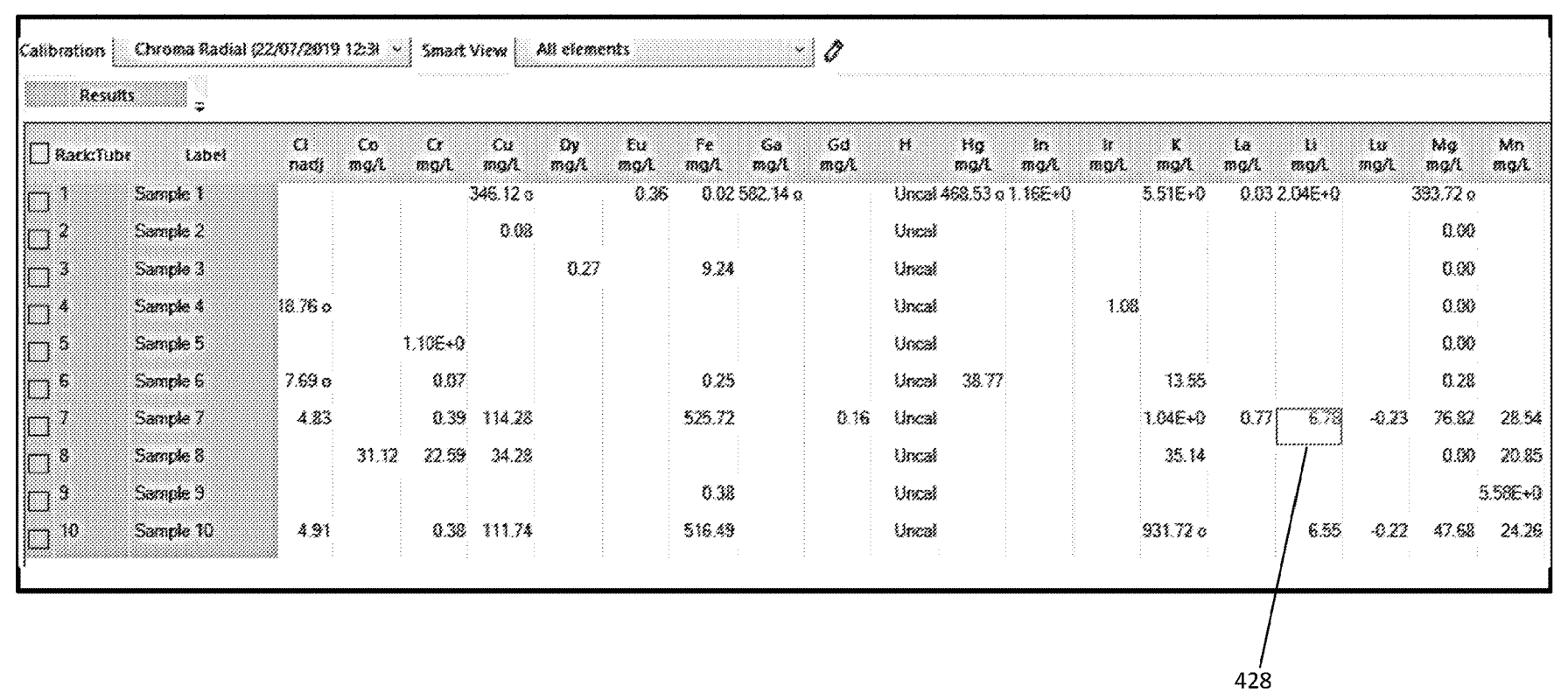
Figure 5D:
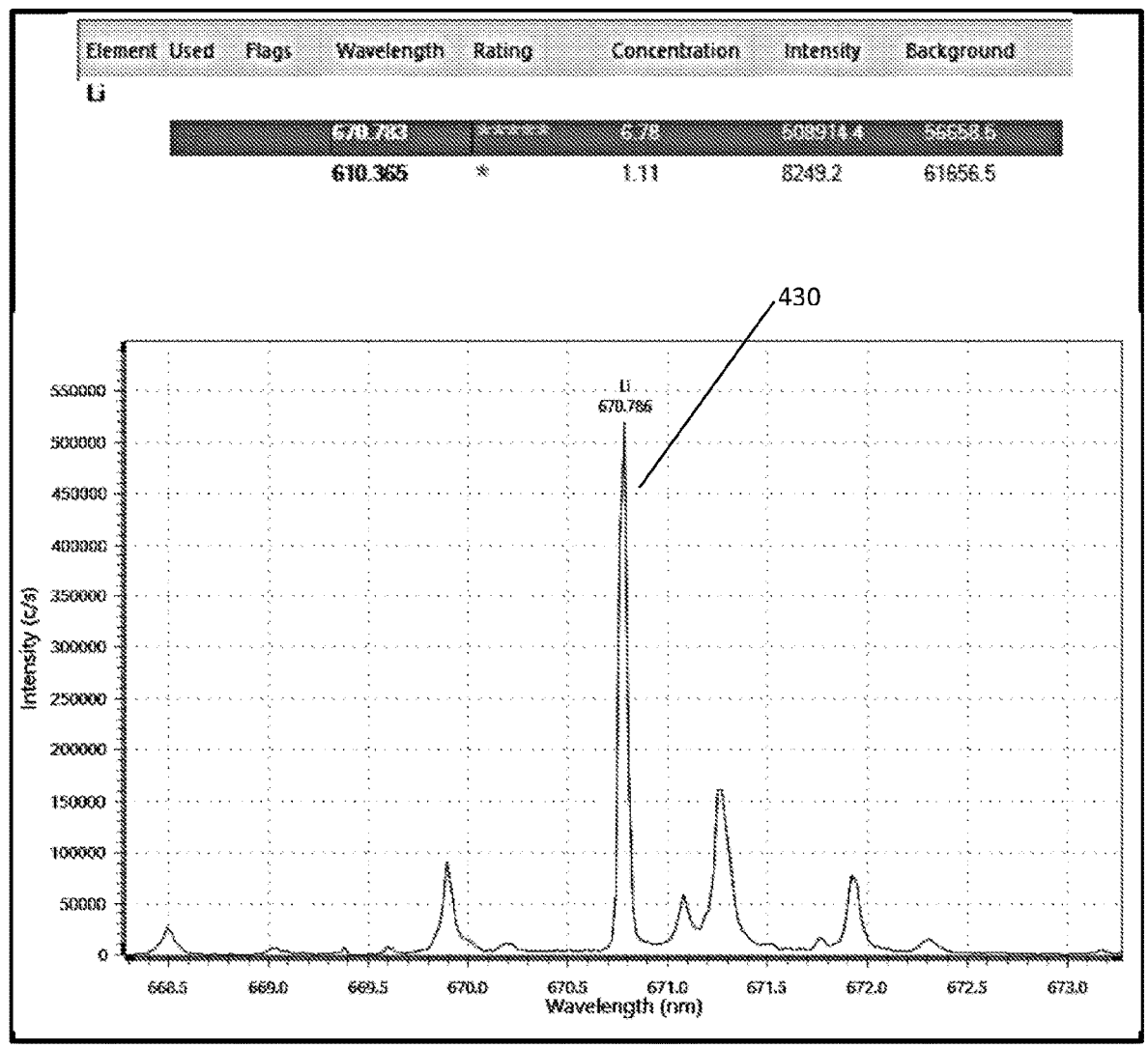
FIG. 5d illustrates display information relating to further results including analyte wavelengths, corresponding confidence ratings and graphical representation of spectral data for an analyte wavelength of element Lithium (Li) in sample 7 as shown in FIG. 5c.

The display information in FIGS. 5c and 5d provides an example of a regular spectral peak associated with an analyte wavelength for Lithium (Li). As shown in FIG. 5c the intensity 428 for element Li in Sample 7 is 6.78 mg/L. FIG. 5d illustrates that analyte wavelength 670.783 nm for Li is given a 5 star rating (reflecting a high confidence factor) due to the identification of the regular spectral peak 430 at 670.774 nm proximate the analyte wavelength of 670.783 nm.

Figure 6:
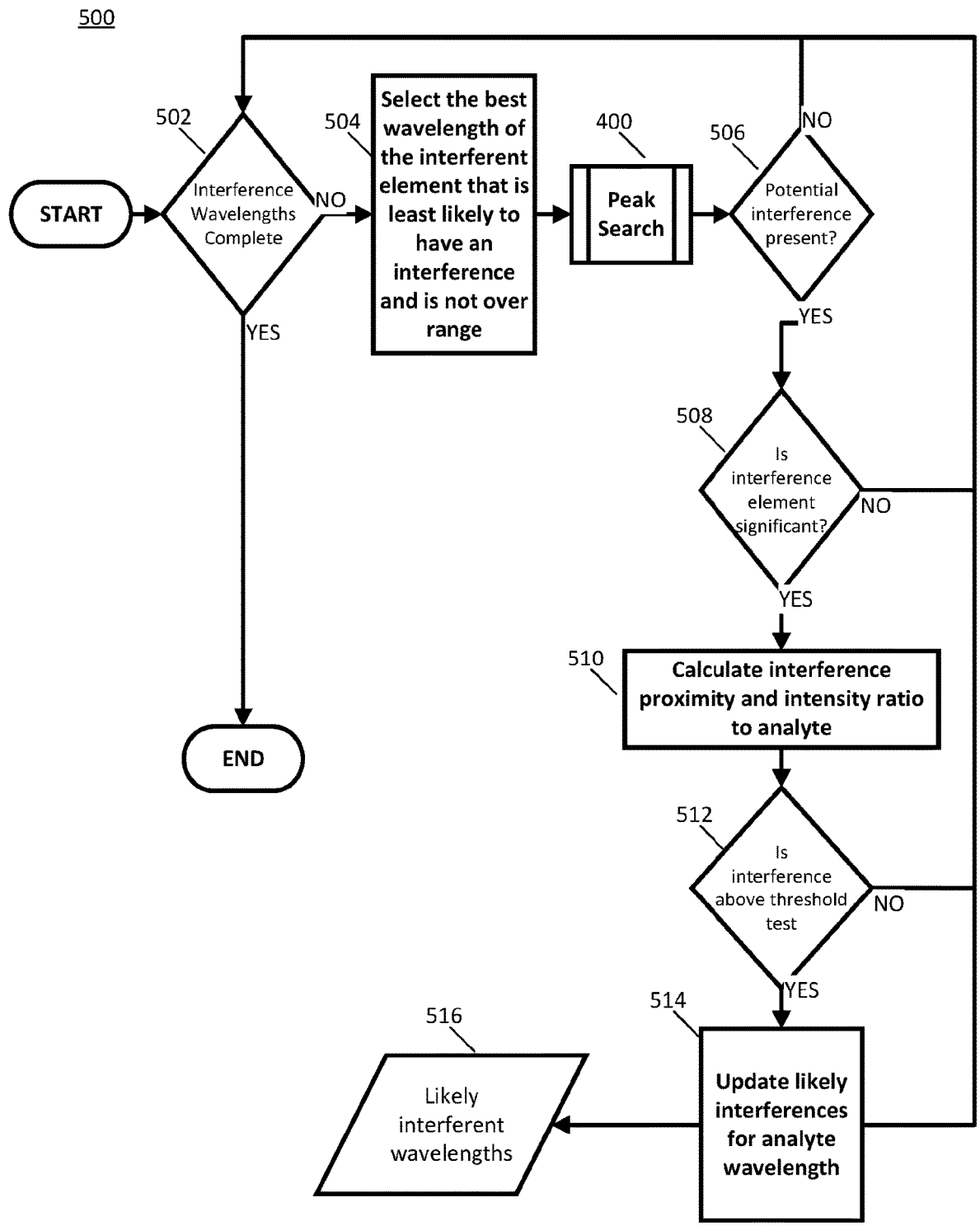
FIG. 6 a process flow diagram illustrating a subprocess for determining interference spectral peaks in the Element Search process shown in FIG. 3.

Subprocess 500 for identifying spectral peaks for each potential interference emission wavelength identified in query step 306 of the Element Search process 300 will now be described with reference to FIG. 6.

At query step 502, determines whether all potential interference emission wavelengths identified in query step 306 have been assessed by subprocess 500. If so, the subprocess 500 is complete. If not, the subprocess 500 obtains the next potential interference emission wavelength for assessment and proceeds to step 504.

At step 504, based on the List of Standard Emission Wavelengths and Interference Emission Wavelengths 222, the subprocess 500 selects a clean interference emission wavelength to determine the presence of an interferent element associated corresponding to the respective interference emission wavelength. Typically, the subprocess 500 attempts to locate the most suitable interference emission wavelength from a list of emission wavelengths associated with the corresponding interference element based on List 222 that is likely to yield a result with acceptable confidence. For example, the subprocess 500 may select an interference emission wavelength on the spectrum that is sufficiently separated from nearby emission wavelengths which could cause spectral interference with the interference emission wavelength. Moreover, the selected clean interference emission wavelength is not associated with a saturated intensity result in the sample spectrum data. Accordingly, the subprocess 500 attempts to locate a clean interference emission wavelength that is least likely to be subject to spectral interference itself and likely to be able to yield an acceptable result.

Figure 4:
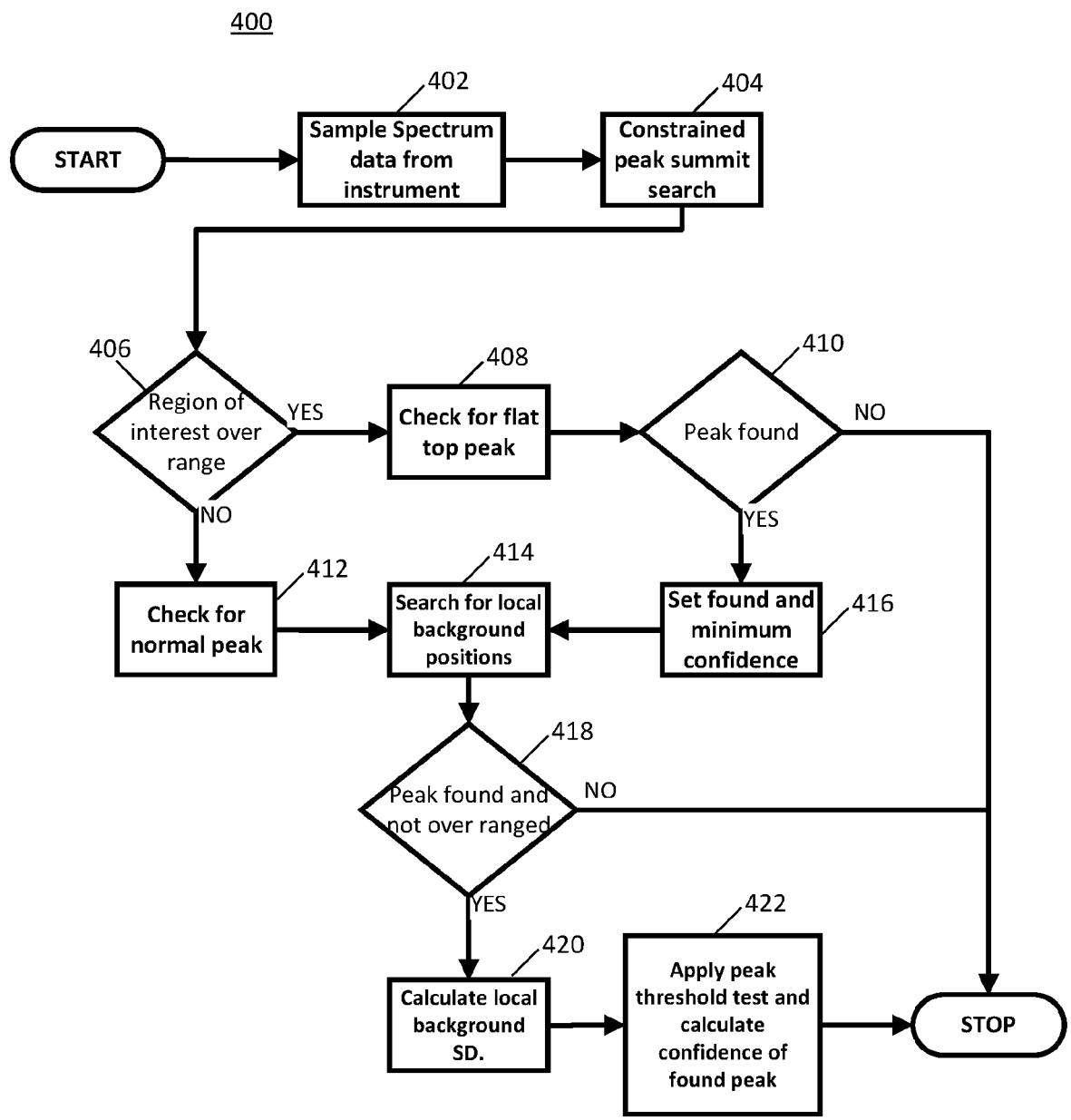
FIG. 4 is a process flow diagram illustrating a subprocess for determining spectral peaks in the Element Search process shown in FIG. 3.

At subprocess step 400, the same spectral peak identification method previously described with reference to FIG. 4 is used to determine whether the selected clean interference emission wavelength corresponds to a spectral peak in the sample spectrum data.

At query step 506, if subprocess 400 determines that no spectral peak corresponds to the clean interference emission wavelength, the subprocess 500 determines that no interferent element corresponding to the clean interference emission wavelength is present in the sample and returns to query step 502 and the next interference emission wavelength is obtained for analysis. If subprocess 400 determines that a spectral peak corresponds to the clean interference emission wavelength, the subprocess 500 determines that an interferent element corresponding to the clean interference emission wavelength is present in the sample and the subprocess 500 proceeds to query step 508.

At query step 508, the subprocess 500 determines whether the detected interferent element is significant based on the confidence factor calculated in subprocess 400. Typically, if the identified interferent element is associated with a confidence factor is greater than a predetermined threshold in the range from 1 to 50, the subprocess 500 determines that the interferent element is significant and proceeds to step 510. If not, the subprocess 500 determines that the interferent element is not significant and returns to query step 502 to retrieve the next available interference emission wavelength.

At step 510, the distance between the spectral peaks for the analyte wavelength and its associated interference emission wavelength is determined. The measured and relative intensities for the detected interferent element and its associated analyte element are also determined. The measured intensities are used to calculate an interference to analyte ratio $$\left( IAR \text{ or } \frac{PSi}{PSa} \right)$$

and the relative intensities are used to calculate a relative intensity interference to analyte ratio $$\left( RIR \text{ or } \frac{Rli}{Rla} \right).$$

At query step 512, the subprocess 500 determines whether the potential interference emission wavelength should be determined as a likely interference wavelength and added to a List of Likely Interference Emission Wavelengths 516 based on the following three threshold tests:

| | |
|---|---|
| peak seperation < S threshold | (1) |
| $\frac{PSi}{PSa} > P$ threshold | (2) |
| $\frac{Rli}{Rla} > R$ threshold | (3) |

Wherein

Sthreshold is the maximum separation between the apex of the spectral peaks corresponding to the analyte wavelength (analyte peak) and the associated interference emission wavelength (interference peak) respectively (typically in the range 1.0 to 20.0), Pthreshold is the minimum value for the ratio of the measured interference peak signal and measured analyte peak signal (usually in the range 0.1 to 10.0), Rthreshold is the minimum value for the ratio of the interference relative intensity and analyte relative intensity (usually in the range 1.0 to 20.0).

Threshold test (1) determines whether the distance between the interference peak and analyte peak is less than a threshold in the range of 1 to 20. Threshold test (2) determines whether the IAR is higher than a threshold in the range 0.1 to 10.0. Threshold test (3) determines whether the RIR is higher than a threshold in the range of 1.0 to 20.0.

If any of the above threshold tests are true, the subprocess proceeds to step 514 and a potential interference emission wavelength is determined to be a likely interference wavelength and added to List 516. If not, the subprocess 512 returns to query step 502 to retrieve the next available interference emission wavelength.

Figure 7A:
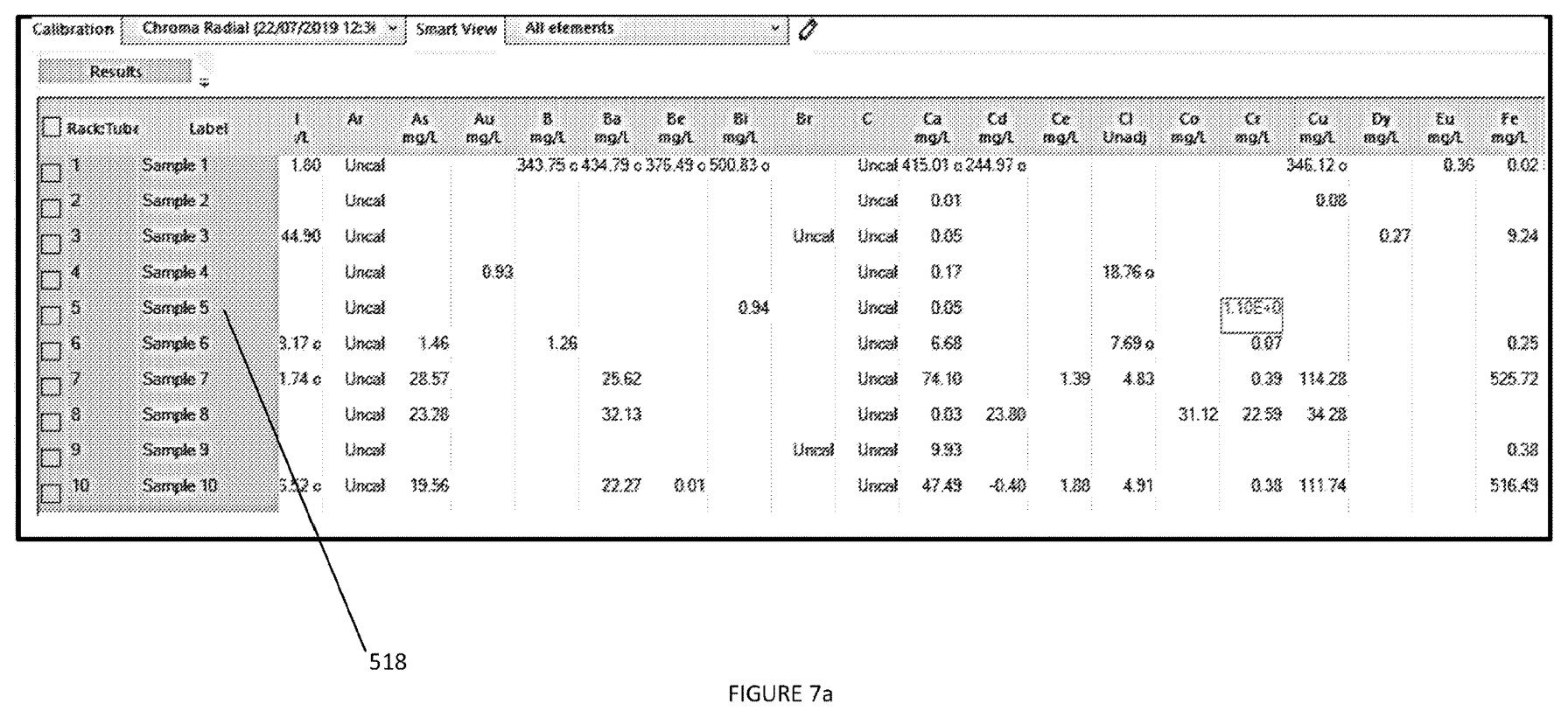
Figure 7B:
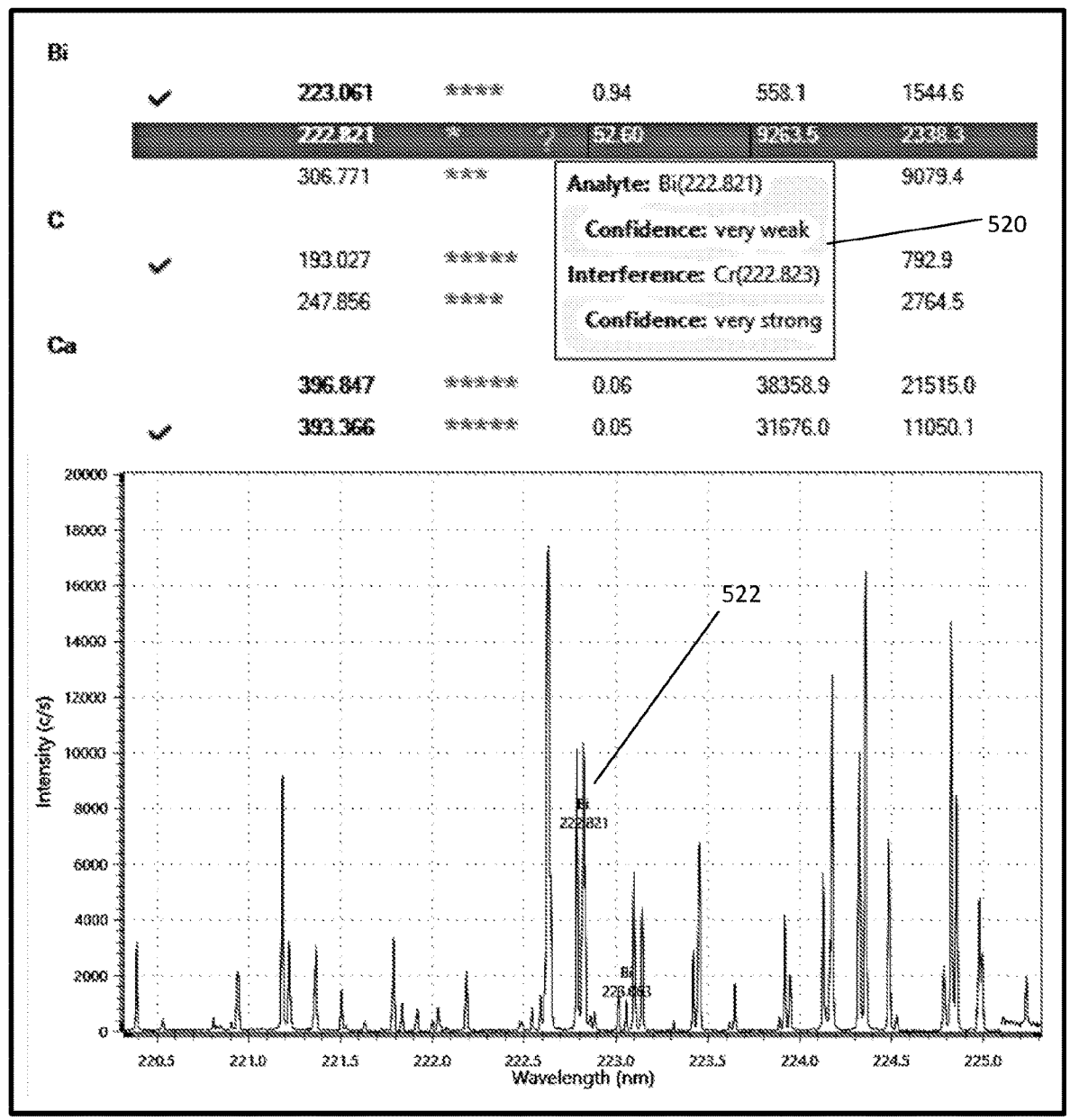

By way of example, FIGS. 7a and 7b illustrates that after using the computer-implemented method 106 to analyse sample 5 (518, FIG. 7a), it has been identified that there is very weak confidence that analyte element Bismuth (Bi) was detected at emission wavelength 222.821 nm due to the very high confidence that interferent element Chromium (Cr) was detected at nearby emission wavelength 222.823 nm (520, FIG. 7b). It is also illustrated in the spectrum shown in FIG. 7B at region 522 that at least two spectral peaks in proximity are present near wavelength 222.821 nm.

Figure 7C:
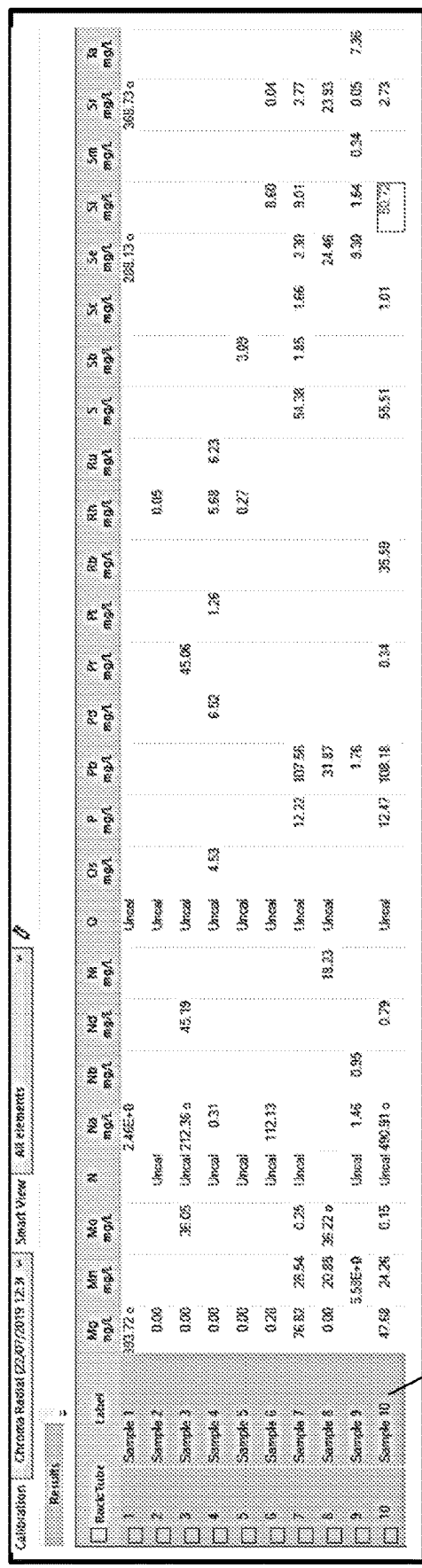
FIG. 7c illustrates display information relating to concentration results determined based on the method shown in FIG. 1a for some of the identified elements for samples 1 to 10 according to an example embodiment of the invention.
Figure 7D:
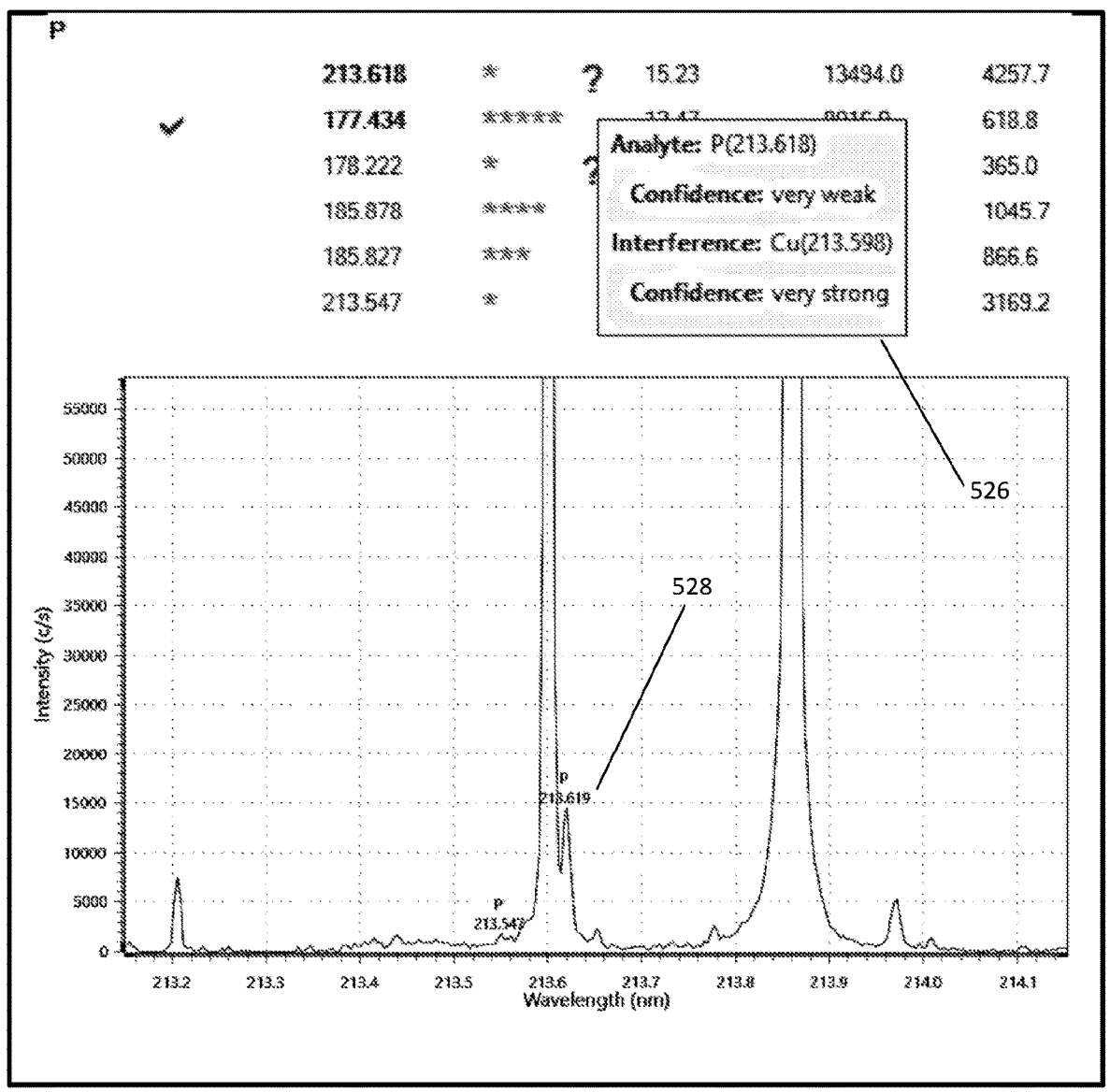
FIG. 7d illustrates display information relating to further results including analyte wavelengths, corresponding confidence ratings and graphical representation of spectral data for analyte wavelengths in sample 10 as shown in FIG. 7c.

Similarly, FIGS. 7c and 7d illustrates that after using the computer-implemented method 106 to analyse sample 10 (524, FIG. 7c), it has been identified that there is very weak confidence that analyte element Phosphorus (P) was detected at emission wavelength 213.618 nm due to the very high confidence that interferent element Copper (Cu) was detected at nearby emission wavelength 213.598 nm (526, FIG. 7d). It is also illustrated in the spectrum shown in FIG. 7d at region 528 that a saturated result is present near wavelength 223.619 nm.

Figure 8:
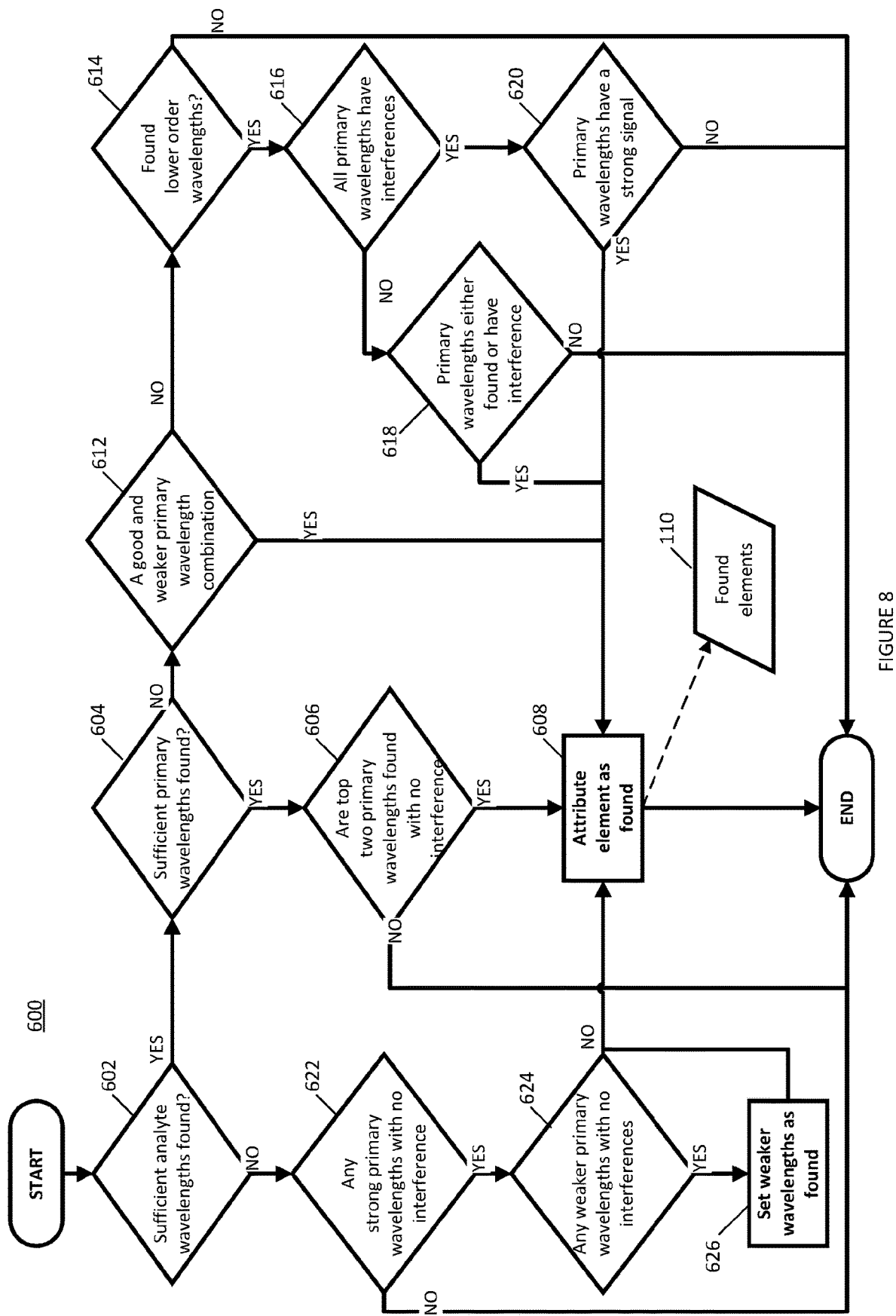
FIG. 8 is a process flow diagram illustrating a subprocess for determining the presence of analyte elements in the Element Search process shown in FIG. 3.

Subprocess 600 for determining with a level of confidence that one or more analyte elements are identified in the sample will now be described with reference to FIG. 8. Subprocess 600 is executed iteratively for each element in the Elements List to determine whether the element can be attributed as found in the sample based on the identified analyte wavelengths in the Revised List 312 based on a set of predetermined criteria.

At query step 602, the subprocess 600 determines whether a minimum number of analyte wavelengths out of the top 10 primary emission wavelengths are identified in the Revised List 312 of analyte wavelengths for each element in the Elements List. In one embodiment, the subprocess 600 determines whether there is a minimum number of 2 analyte wavelengths for elements having more than two emission wavelengths, and 1 analyte wavelength for elements having less than two emission wavelengths. Typically, the analyte wavelengths are ranked according to their associated confidence factor. If so, the subprocess 600 proceeds to query step 604. If not, the subprocess 600 proceeds to query step 622.

At query step 604, the subprocess 600 determines whether a minimum number of analyte wavelengths out of the top 3 primary emission wavelengths are identified in the Revised List 312 of analyte wavelengths for each element in the Elements List. In one embodiment, the subprocess 600 determines whether there is a minimum number of 2 analyte wavelengths for elements having more than two emission wavelengths, and 1 analyte wavelength for elements having less than two emission wavelengths. Typically, the analyte wavelengths are ranked according to their associated confidence factor. If so, the subprocess 600 proceeds to query step 606. If not, the subprocess 600 proceeds to query step 612.

At query step 606, if the minimum number of analyte wavelengths found are unlikely to be associated with any spectral interference, the subprocess 600 proceeds to step 608. Otherwise, the subprocess 600 terminates for the currently assessed analyte element and the subprocess 600 is iteratively executed for the next element in the Elements List.

At step 608, the currently assessed analyte element is attributed as found. The identified element and its associated analyte wavelengths are added to the List of Identified Elements and Analyte Wavelengths 110.

At query step 612, the subprocess 600 determines whether at least one of the analyte wavelengths for the current analyte element is a strong primary wavelength (e.g. having a confidence factor greater than 10) unaffected by spectral interference, and at least one of the analyte wavelengths for the current analyte element is a lower order analyte wavelength (e.g. having a confidence factor between 1 and 3) unaffected by spectral interference from the top 10 primary wavelengths. Essentially, at query step 612, the subprocess 600 determines whether for each element there is at least one strong primary analyte wavelength and a supporting weaker analyte wavelength. If so, the subprocess 600 proceeds to step 608 and the current analyte element is attributed as found and added to List 110 along with the associated analyte wavelengths. If not, the subprocess 600 proceeds to query step 614.

At step 614, the subprocess 600 checks whether lower order analyte wavelengths from the top 10 primary wavelengths were found for the assessed element in the Revised List 312. If so, the subprocess 600 proceeds to query step 616. If not, the subprocess 600 terminates for the currently assessed analyte element and the subprocess 600 is iteratively executed for the next element in the Elements List.

At query step 616, if all lower order analyte wavelengths found are subject to spectral interference, the subprocess 600 proceeds to step 620. If not, the subprocess 600 proceeds to step 618.

At step 618, the subprocess 600 checks if some of the lower order analyte wavelengths found without spectral interference or have relatively weak spectral interference. If so, the subprocess 600 proceeds to step 608 and the respective analyte element is attributed as found on the lower order analyte wavelengths. The element and the associated analyte wavelengths are then added to the List 110. If not, the subprocess 600 terminates for the currently assessed analyte element and the subprocess 600 is iteratively executed for the next element in the Elements List.

At step 620, the subprocess 600 determines whether the primary analyte wavelengths found each have a strong signal. If so, the subprocess 600 proceeds to step 608 and the respective analyte element is attributed as found on the lower order analyte wavelengths. The element and the associated analyte wavelengths are then added to the List 110. If not, the subprocess 600 terminates for the currently assessed analyte element and the subprocess 600 is iteratively executed for the next element in the Elements List.

At query step 622, the subprocess 600 determines whether any strong analyte wavelengths (e.g. confidence factor greater than 10) have been found from the top 10 primary wavelengths for the current analyte element. If so, the subprocess 600 proceeds to query step 624. If not, the subprocess 600 terminates for the currently assessed analyte element and the subprocess 600 is iteratively executed for the next element in the Elements List.

At step 624, the subprocess 600 determines whether any weaker analyte wavelengths (e.g. confidence factor between 1 and 3) have been found from the top 10 primary wavelengths for the current analyte element. If so, the subprocess 600 proceeds to query step 626. If not, the subprocess 600 proceeds to step 608 and the element is attributed as found on the strong primary wavelength identified in query step 622. The element and the associated analyte wavelengths are then added to the List 110.

At step 626, the weaker analyte wavelength (and the strong primary analyte wavelength from step 622) is attributed as found with respect to the analyte element. The element and the associated analyte wavelengths are then added to the List 110.

Process 700 for re-assessing and validating whether any of the analyte wavelengths associated with each of the elements in the List 110 are nevertheless subject to spectral interference. Process 700 is therefore a finetuning step to re-evaluate each of the analyte wavelengths for the elements in List 110 to remove any elements from List 110 that is likely to be subject to spectral interference.

At query step 702, for each element in List 110, the process 700 determines whether there are any further corresponding analyte wavelengths for re-evaluation by process steps 704 to 714. If so, the process 700 proceeds to step 704. If not, the process 700 proceeds to subprocess 600.

At query step 704, the process 700 iterates through all potential interference emission wavelengths corresponding to the current analyte wavelength and selects the next available potential interference emission wavelength for consideration by query step 706. If no further available interference emission wavelengths are remaining, the process 700 returns to query step 702. If there are further available interference emission wavelengths remaining, the process 700 proceeds to query step 706 with the next available interference emission wavelength.

At query step 706, the process 700 determines whether the current interference emission wavelength has a corresponding element in the List 110. If so, the process 700 proceeds to 708. If not, the process 700 returns to query step 704 to retrieve the next available interference wavelength.

At query step 708, if the interference emission wavelength has previously been identified to be associated with the respective analyte wavelength, the process 700 returns to query step 702 to retrieve the next analyte wavelength associated with the current element in List 110. If the interference emission wavelength has not been previously been identified to be associated with the respective analyte wavelength, the process 700 proceeds to step 710 to determine the impact of the interference.

At step 710, a proximity scalar is calculated to determine the significance of the interference. Typically, the following calculation may be used, 1.0 minus the wavelength gap (in nm) between analyte and interference wavelength. Other suitable calculations based on the distance between the analyte wavelength and corresponding interference emission wavelength can also be used. In addition, a relative intensity ratio of the analyte wavelength peak intensity and the highest confidence element interference wavelength peak intensity will be calculated.

At query step 712, the process 700 determines whether the proximity scalar exceeds a threshold (typically in the range of 0.2 to 1.0), and whether the scaled intensities and relative intensities are higher than a given threshold (typically in the range 0.05 to 0.9). If so, the process 700 proceeds to step 714. If not, the process 700 returns to query step 702 to retrieve the next available analyte wavelength.

At query step 714, the process 700 updates the List of Likely Interference Emission Wavelengths 516 with the interference wavelength assessed in step 712.

At subprocess 600, for each element in List 110, once all corresponding analyte wavelengths for the identified element has been processed via steps 704 to 714, subprocess 600 is re-executed based on the updated List of Likely Interference Emission Wavelengths 516.

At query step 718, re-execution of subprocess 600 determines whether each element in the current List 110 is present in the sample with an acceptable level of confidence. If the current element is determined to not be present in the sample with an acceptable level of confidence, the process 700 ends. Otherwise, the process 700 proceeds to step 720. Typically, the subprocess 600 determines whether an analyte wavelength associated with an element is present with an acceptable level of confidence. An inference can then be made as to whether the associated element is present in the sample based on the level of confidence determined for the analyte wavelength.

At step 720, the process 700 removes the current element and associated analyte wavelength from the List 110.

Figure 10:
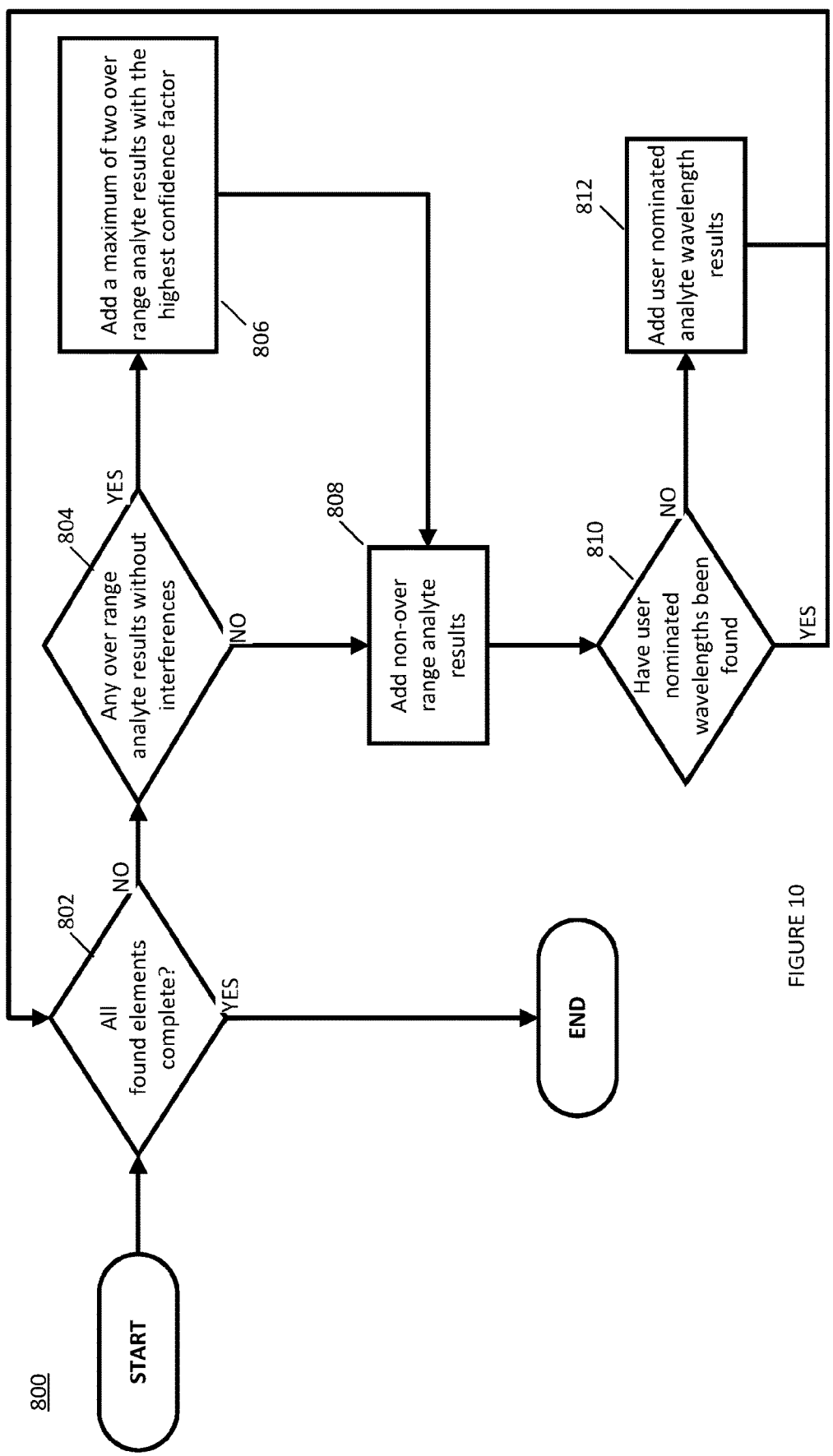

Process 800 for assessing the analyte wavelengths from List 110 generating a List of Accepted Analyte Wavelengths (ultimately for display via the display device 104) will now be described with reference to FIG. 10. Typically, the selection is made based on predetermined criteria, for example, including any one or more of the follow:

Whether the analyte wavelength is associated with a saturated result

Whether the analyte wavelength is associate with spectral interference

A maximum number of analyte wavelengths to display for each corresponding element Whether an analyte wavelength is associated with a user selection At query step 802, the process 800 determines whether all elements in List 110 have been assessed based on steps 804 to 812. If so, the process 800 terminates. If not, the process 800 proceeds to query step 804.

At query step 804, the process 800 determines whether for each element in List 110, the element is associated with at least one saturated intensity measurement for an analyte wavelength that is without spectral interference. If so, the process 800 proceeds to step 806. If not, the process 800 proceeds to step 808.

At step 806, the process 800 selectively includes a maximum of two saturated analyte wavelength measurements having highest confidence factor in the List of Accepted Analyte Wavelengths.

At step 808, the process 800 selectively includes non-saturated analyte wavelengths associated with the element from List 110 to the List of Accepted Analyte Wavelengths.

At query step 810, the process 800 determines whether any user selected wavelengths have already been included in the List of Accepted Analyte Wavelengths. If so, the process 800 returns to query step 802 and retrieves the next element from List 110 for processing. If not, the process 800 selectively includes the user selected analyte wavelength to the List of Accepted Analyte Wavelengths. Typically, in this case, the user selected analyte wavelength was not determined to be attributed as found with respect to an associated analyte element in the previously executed processes. However, the result associated with the user selected analyte wavelength may still be displayed in the List of Accepted Analyte Wavelengths.

Figure 11:
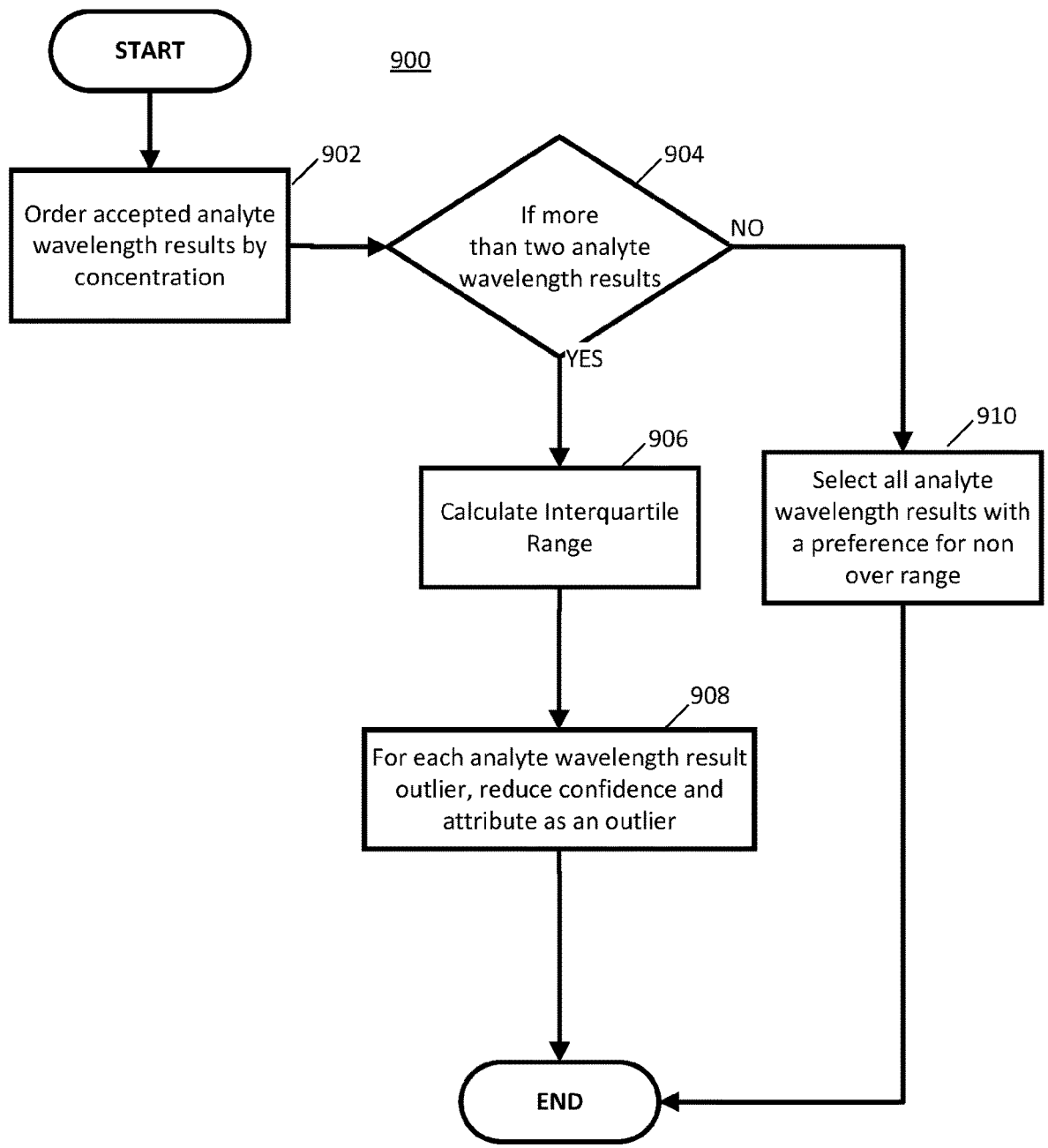

Process 900 for checking the analyte wavelengths the List of Accepted Analyte Wavelengths for any outlier results to identify any gross outliers that are usually a result of undocumented interferences (i.e. emission wavelengths that are not in the List of Standard Emission Wavelengths and Interference Emission Wavelengths 222) will now be described with reference to FIG. 11.

At step 902, the analyte wavelengths in the List of Accepted Analyte Wavelengths are ordered based on the measured concentration of the associated analyte element in the sample. The concentration of each analyte element is determined based on an intensity concentration curve.

At query step 904, if there are more than two analyte wavelength results for each element, the process 900 proceeds to step 906. If not, the process 900 proceeds to step 910.

At step 906, an interquartile range calculation is applied to the analyte wavelengths. In other examples, one or more different calculations may be applied, for example Z-Scores, Modified Z-Scores, Lognormal Distribution and the like.

At step 908, for each analyte wavelength corresponding to an outlier result, the confidence factor associated with the analyte wavelength is reduced. The analyte wavelength is also attributed as an outlier.

At step 910, all analyte wavelengths are selected to be retained in the List of Accepted Analyte Wavelengths.

Figure 12:
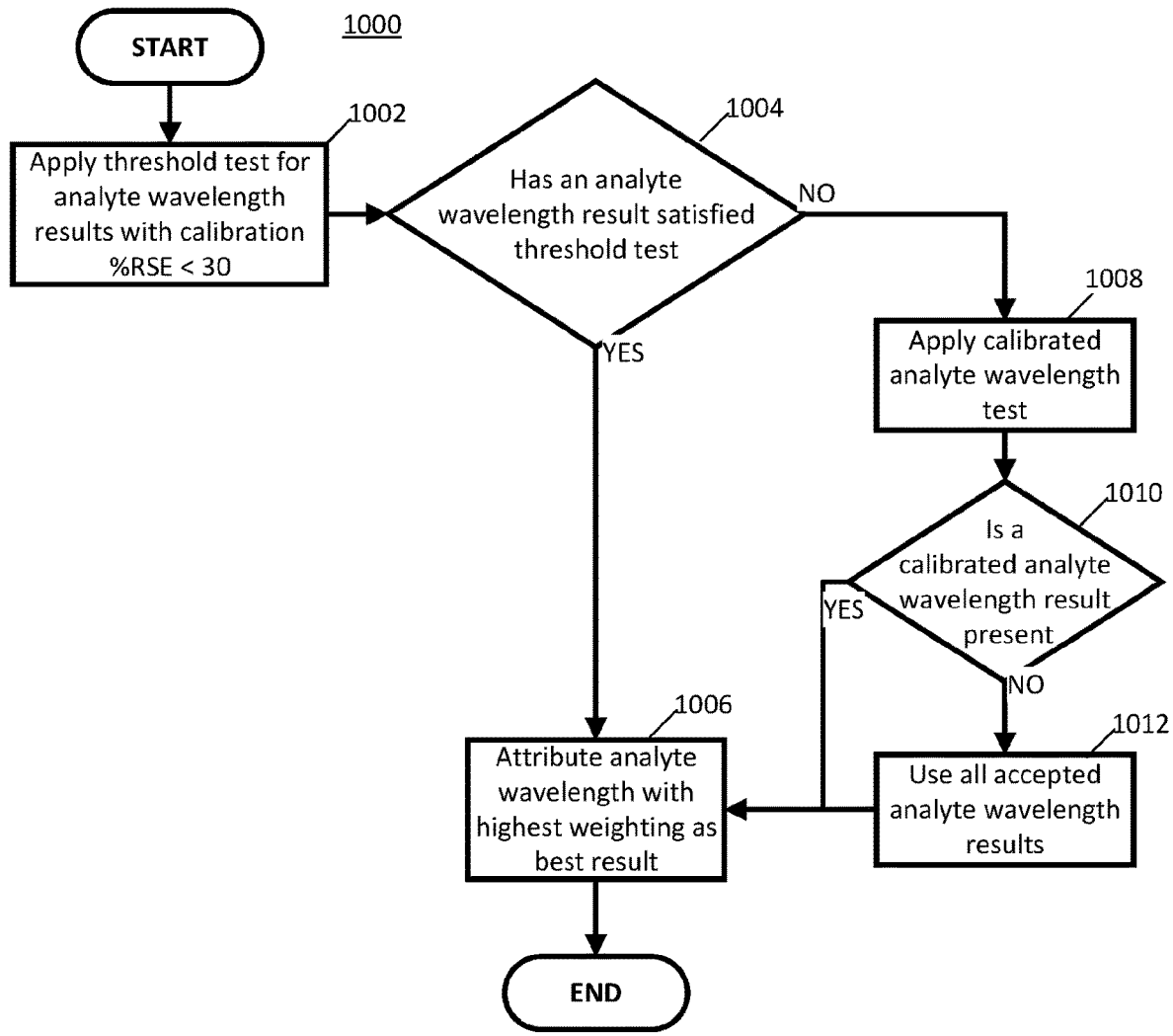

Process 1000 for selecting and ordering the best analyte wavelengths for display on the display device 104 will now be described with reference to FIG. 12. In process 1000, a threshold test is applied to the accepted analyte wavelength results from the outlier check process 900. To satisfy the threshold test, an analyte wavelength result must not correspond to a saturated result and must have an acceptable calibration curve.

The metric for determining an acceptable calibration curve may include but is not limited to, least square goodness of fit correlation coefficient and percentage relative standard error (RSE). This calibration curve metric would be tested against an appropriate predetermined threshold. If no analyte wavelength result has satisfied the test, then a more relaxed test is used to include calibrated analyte wavelength results. If no analyte wavelength result is calibrated, then all accepted analyte wavelength results are used. Finally, those analyte wavelength results that pass a given threshold test are ordered based on an appropriate weighting.

Examples of weighting factor calculations may include but are not limited to:

the confidence factor multiplied the by square root of the relative intensity of the analyte wavelength
the confidence factor of the analyte wavelength
the confidence factor divided by square root of the primary order number of the analyte wavelength The analyte wavelength result with the highest weighting is selected to report the semi-quantitative concentration for the element.

At step 1002, the threshold test discussed above is applied. In particular, the process 1000 determines whether an analyte wavelength result corresponds to a saturated result, and whether the analyte wavelength has an acceptable calibration curve (e.g. with a relative standard error lower than 30%).

At query step 1004, if the analyte wavelength satisfies the threshold test (e.g. not associated with saturated result and has an acceptable calibration curve), the process 1000 proceeds to step 1006. If not, the process 1000 proceeds to step 1008.

At step 1006, the analyte wavelengths are ordered based on weighting factor calculations discussed above. The analyte wavelength with the highest weighting is selected for display on the display device 104 along with the associated concentration results for the corresponding analyte element.

At step 1008, a calibrated analyte wavelength test (e.g. a lower threshold test than the one in step 1002) is applied. For example, a Boolean check on the calibration curve is performed to check if a minimum number of standards are satisfied. The calibration curve may also include an acceptable correlation coefficient.

At query step 1010, if a calibrated analyte result is present based on the test in step 1008, the process 1000 proceeds to step 1006. If not, the process 1000 proceeds to step 1012.

At step 1012, all analyte wavelengths in the List of Accepted Analyte Wavelengths are selected for weighting factor calculations in step 1006.

Figure 13:
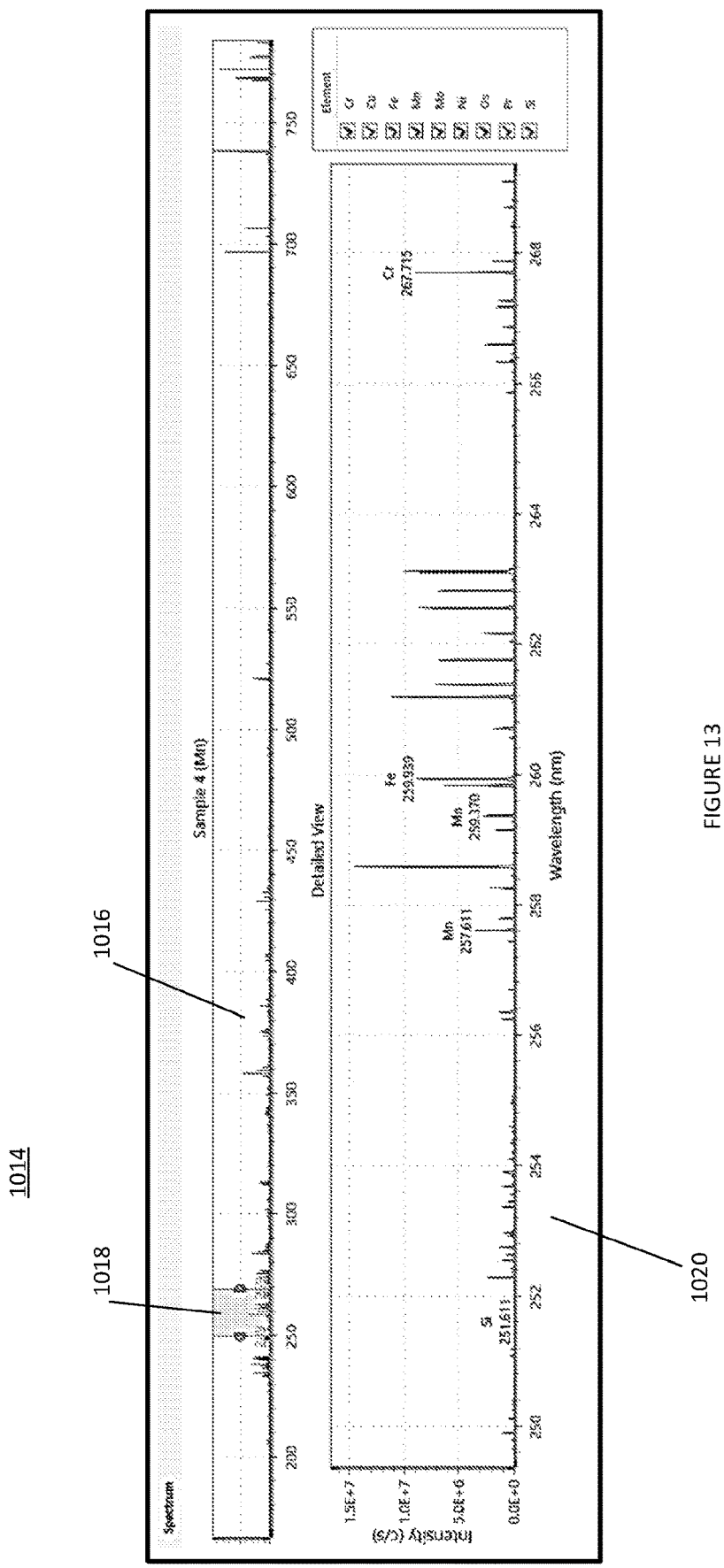
FIG. 13 illustrates display information in the form of graphical representations of identified analyte wavelengths and analyte elements in a selected portion of the sample spectrum data according to one example embodiment of the invention.

FIG. 13 illustrates graphical representation of results 1014 from the List of Accepted Analyte Wavelengths for display via display device 104. In particular, FIG. 13 shows sample spectrum data 1016 for Sample 4. It is further illustrated that the system 100 enables selection of a section 1018 of the spectrum for detailed view in spectrum 1020, which provides labelling of one or more analyte wavelengths and associated analyte elements from the List of Accepted Analyte Wavelengths at corresponding locations on the spectrum 1012.

In practice, ICP-OES techniques can be used to quantitate for up to 70 different elements in any given sample solution, and different samples may contain greatly variable combinations and concentrations of these elements. The automated element identification functionality in embodiments of the present invention allows users with no knowledge of the contents of a solution to quickly identify the elemental components present in this solution. This allows for unusual or unanticipated sample contents to be identified where they may be overlooked if a manual approach to element identification is taken.

Furthermore, ICP-OES emission lines for an element are often subject to spectral interferences, which occur when an analytical wavelength is partially or completely overlapped by an emission from another element or molecule or is otherwise impacted by unstructured background radiation. The presence and magnitude of a spectral interference is highly sample-dependent, even within the same method, and the appearance of analyte wavelengths which have been impacted by a spectral interference can be only subtly different from those which are interference-free; on occasions when the emission from an interferent is only slightly separated from that of the analyte wavelength, it may not be possible to visually identify that an interference is present.

The interference avoidance functionality of embodiments of the present invention cross-references multiple components of the spectral data for each measured solution with known wavelength locations for all elements which can be quantitated by ICP-OES. This allows for fast and automated identification of instances where an interference is present on a given analyte wavelength, even in cases of complete spectral overlap between these interferent and analyte wavelengths. This precludes the need for the operator to have knowledge of potential spectral overlaps or the contents of their solutions in order to identify instances of interference.

Example applications of the system and method according to example embodiments of the invention will now be described below.

Example 1: Rapid Sample Assessment and Assisted Method Development For ICP-OES

In ICP-OES analysis, spectral interference and incorrect sample preparation are two of the most common causes of erroneous results. Spectral interferences can vary significantly from one sample to another and are particularly prevalent in samples containing high concentrations of spectrally-rich elements such as iron (Fe) or titanium (Ti). These interferences can go unnoticed, particularly by inexperienced operators, and will often manifest in reported results as an abnormally high concentration for the element affected by the interference. Sample preparation errors can be equally difficult to detect and will have an impact on results which is dependent on the specific error and preparation method being used.

Figure 14:
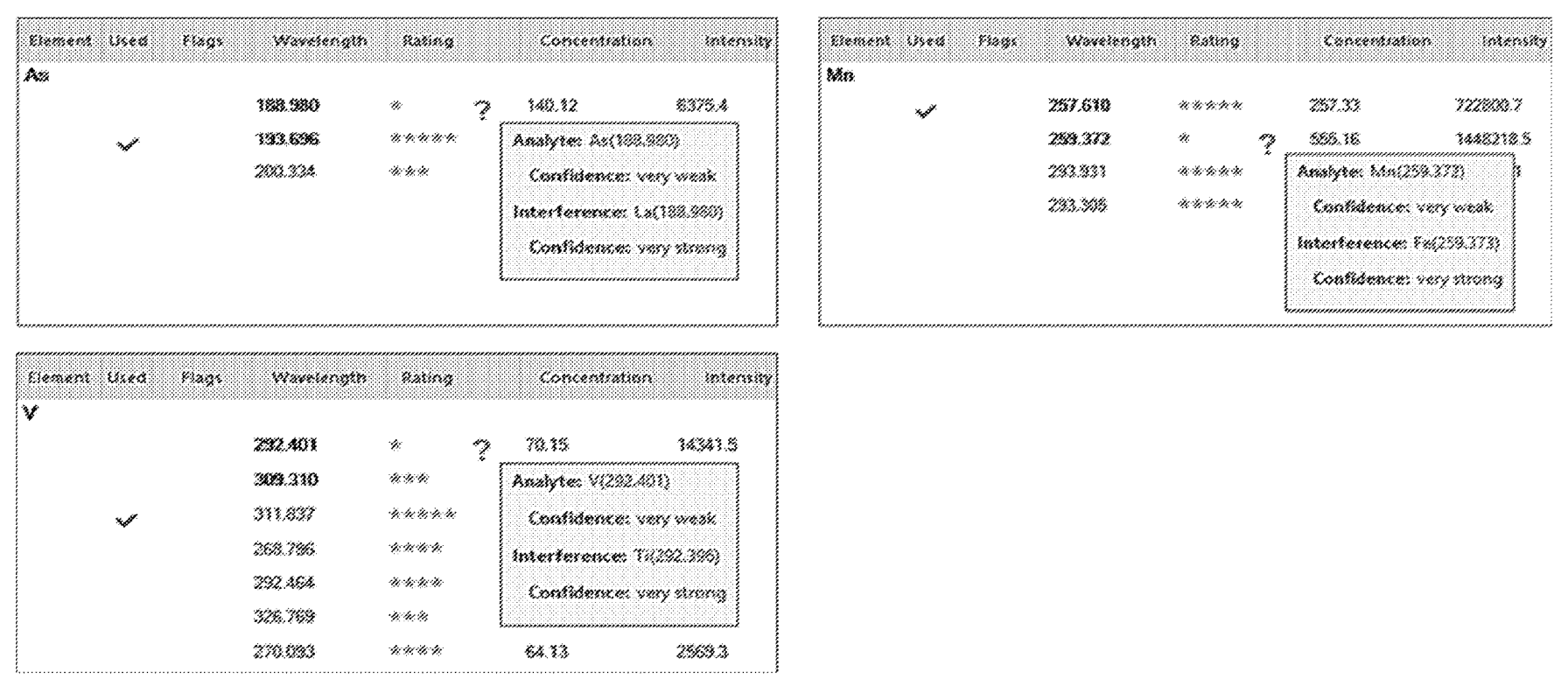

The system and method according embodiments of the present invention for ICP-OES collects and interprets full-spectrum data for every sample, adding just seconds to each analysis. The algorithms behind the interpretation will automatically identify the elemental composition of each sample, as well as the presence of spectral interferences on common analyte wavelengths, without any input required from the user. The experimental results below demonstrate the use of method and system in identifying significant spectral interferences (see FIG. 14) affecting several measurements in solid waste samples prepared according to standard method HJ 781-2016, including a lanthanum (La) interference on arsenic (As), an iron (Fe) interference on manganese (Mn), and a titanium (Ti) interference on vanadium (V). In each case the interference and suspected cause are clearly and automatically flagged in a software user interface, and an unambiguous rating system is used to express the quality of the analyte peak at each wavelength of the analyte element. Deliberately challenging sample matrices were chosen for these experiments, successfully demonstrating the robustness of the spectral interference identification technique for even the noisiest spectra.

The interference information provided by embodiments of the invention can be quickly and easily obtained without the need for any method development or element selection on the part of the user. In some embodiments, method 106 will automatically report results for every element that it detects in each sample, on a per-sample basis. Not only is no method development required to obtain this information, the information itself can provide a valuable first step in subsequent method development by alerting users to interferences which may be present in their samples and giving a clear recommendation as to the quality of other wavelengths for each detected element. The interferent information can even be used to aid in the selection of an interference correction technique, helping to ensure that these corrections are being applied appropriately and are compensating for the interferents which are truly present in the samples being measured.

Figure 15:
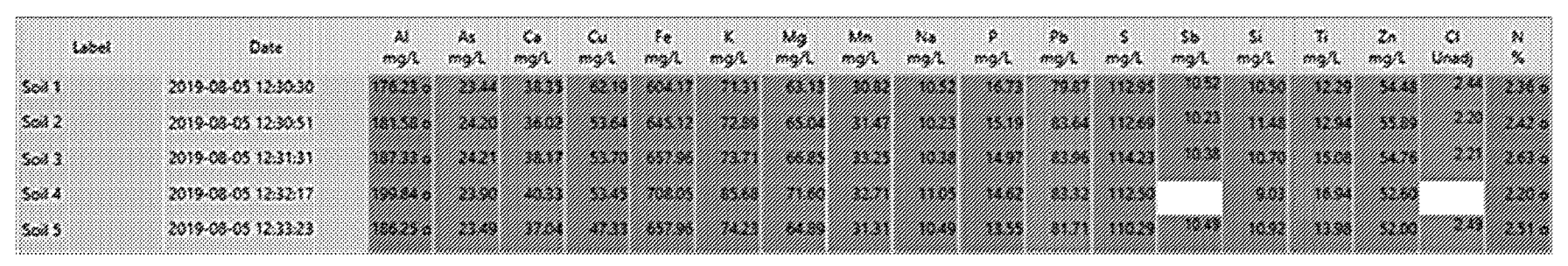

In some embodiments, identification of a common sample preparation error (insufficient addition of hydrochloric acid to an acid digest) is shown to be possible, an add-on to the core functionality aimed at high-throughput screening applications. Semi-quantitation of chlorine (Cl) in the sample along with convenient, real-time conditional formatting and filtering tools allow immediate identification of samples with abnormally low hydrochloric acid content (see FIG. 15). Advantageously, the user interface may ensure that even inexperienced instrument operators are able to obtain this sample insight quickly and easily.

Figures 16A, 16B:
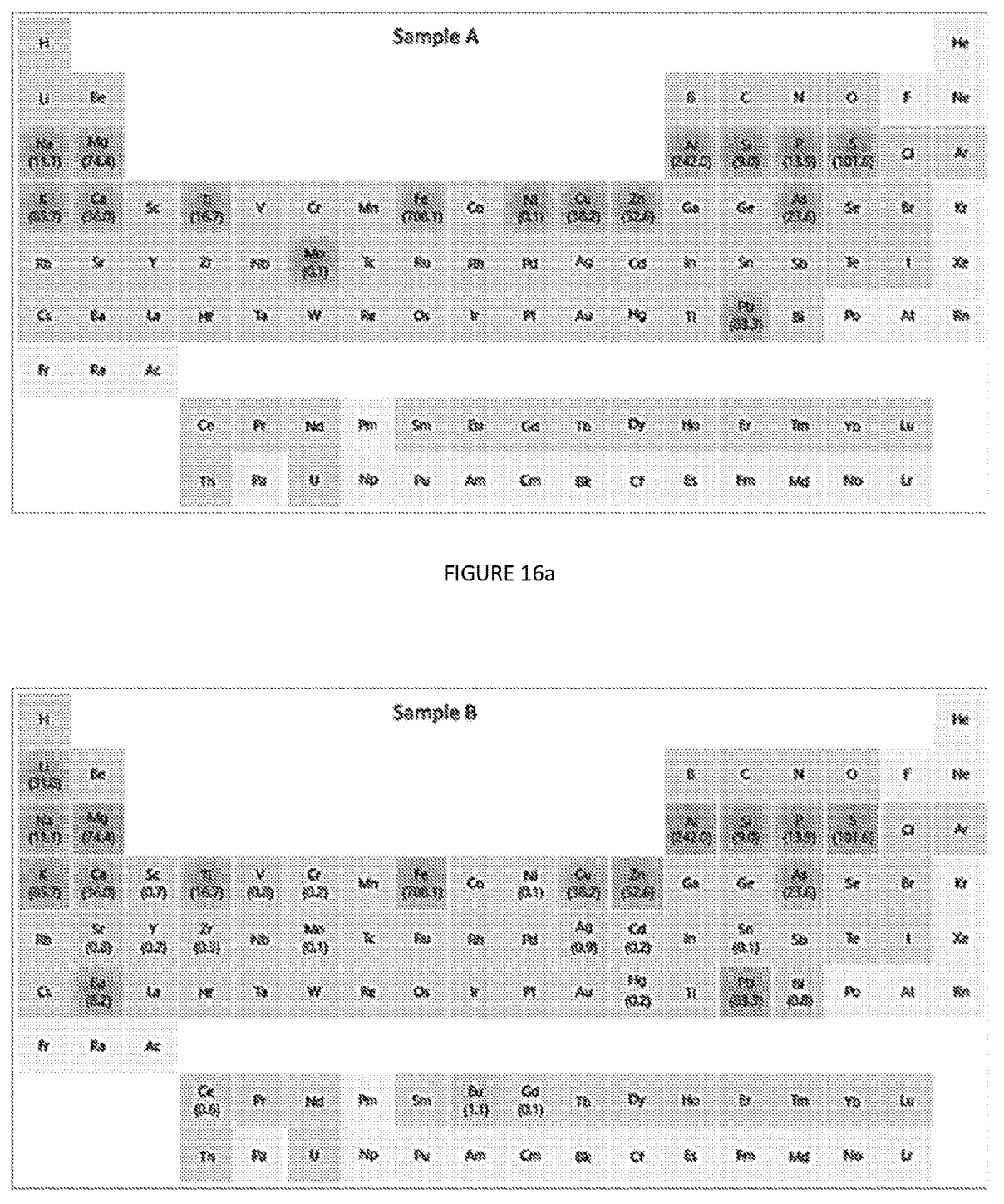

The user interface may provide a convenient suite of graphical tools to visualise the contents of each measured solution. In some embodiments, the user interface allows users to gain an instant appreciation for the content of their samples using inbuilt colour-coded periodic table heatmap graphics (see FIGS. 16a and 16b). Typically, colour-coding for each element is customisable and is relative to the concentration of that element detected in each sample, allowing users to make easy qualitative comparisons of elemental content between samples (also shown in FIG. 15). In some embodiments, visualisations can be exported or inclusion in sample reports post-analysis.

Advantageously, the computer-implemented method 106 can be modular and compatible with other software modules to interface with instrument 102. Embodiments of the invention provides users with a high level of insight into the content of their samples while requiring no knowledge of spectroscopy and only minimal setup. In practice, the elemental composition of a sample and all information described in the previous paragraphs may be obtained in 15 seconds (inclusive of appropriate sample uptake and rise delays); screening of an entire rack of 60 samples may be performed in only 15 minutes.

Example 2: Streamlined Method Development for DTPA Extracted Soil Samples

Soil samples were prepared for analysis according to Chinese HJ-804 method. Eight bio-available elements were measured in the DTPA extracted soil samples using the Agilent 5800 VDV ICP-OES fitted with an AVS 6 valve system and SPS 4 autosampler.

Sample screening was conducted according to embodiments of the present invention, and was used to assist with method development, resulting in high-quality results and no sample re-measurements. Reporting tools provided by embodiments of the invention generated quantitative worksheets to facilitate semiquantitative analysis and offered sample insights to complement the quantitative data.

Method development can be tedious and time-consuming. Poorly developed methods can lead to inaccurate data being reported and costly remeasurements. Method development according to one example embodiment of the invention can include the following three steps.

Step 1: Run Sample

Sample screening according to method 106 is quick and easy to set up. There's no need to select any elements or wavelengths. The screening captures data from the entire wavelength range in roughly 15 seconds, and the automatic element discovery algorithms choose the elements and wavelengths for the operator.

Step 2: Add the Recommended Wavelengths to the Quantitative Method

The screening proposes a list of recommended wavelengths for every element detected in each of the samples.

For this application, all the wavelengths chosen by the screening process were also suggested in the HJ-804 regulated method, indicating the reliability of the method 106 algorithm.

Using Mn as an example (see FIG. 17), screening according to method 106 identified multiple wavelengths with a five-star confidence rating, indicating that these wavelengths are likely to be suitable for a quantitative method.

Figures 17, 18:
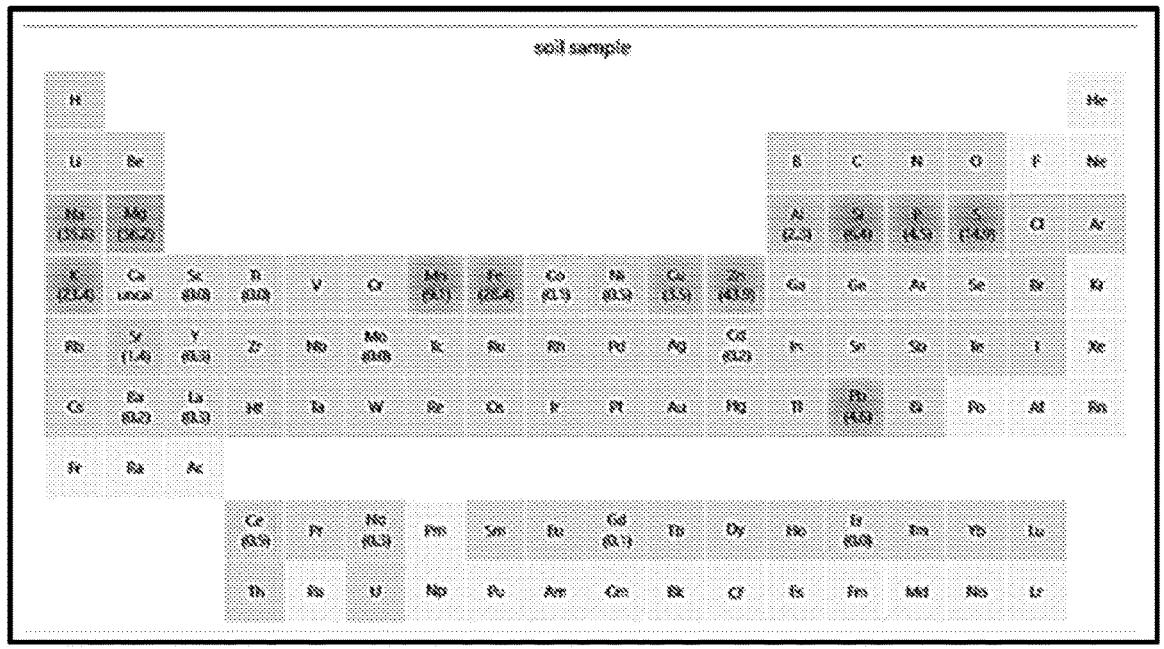
FIG. 17 is an extract from a user interface of the system according to one embodiment of the invention illustrating a confidence rating table for Mn analyte wavelengths. The user interface further provides an information box showing possible Fe interferences on two Mn prime lines upon user request.
FIG. 18 further illustrates a heat map showing relative concentrations of all other elements in a sample.

Output shown in FIG. 17 recommends Mn 257.610 as the highest rated analyte wavelength based on the quality of the analyte peak, and its freedom from interferences. The HJ 804 method recommended Mn 257.610 and also Mn 293.305, corresponding to output analyte wavelengths associated with high confidence ratings.

The question marks next to the low-star rated wavelengths indicate an issue on two primary Mn lines. The pop-up box for the Mn 259.372 line states very weak confidence in the result due to strong Fe interference. The Mn 294.921 line was also affected by the Fe interference, as indicated by method 106. Based on these sample insights, both wavelengths were excluded from the quantitative method.

Step 3: Run the Quantitative Method

Run the quantitative analysis using the wavelengths recommended by the above screening and collect semiquantitative data. This approach allows you to run regulated methods, while also gathering semiquantitative data for up to 70 elements that can be present in a sample, as shown in FIG. 18.

The same automatic element discovery algorithms used the screening assess the semiquantitative data collected for every sample. The software calculates the approximate concentration of all other elements in the sample and automatically identifies the presence of spectral interferences.

For additional confidence in the results, output data from method 106 can be used to verify the full quantitative results. As shown in the table below, the semiquantitative concentrations were within ±25% of the full quantitative results, demonstrating satisfactory confidence in results generated according to embodiments of the present invention.

| Element | Concentration (mg/L) | |
| --- | --- | --- |
| | Quantitative | Output data based on Method 106 |
| Cd | 0.15 | 0.17 |
| Co | 0.07 | 0.05 |
| Cu | 3.30 | 3.46 |
| Fe | 29.3 | 28.4 |
| Mn | 8.57 | 9.12 |

-continued

| | Concentration (mg/L) | |
|---|---|---|
| Element | Quantitative | Output data based on Method 106 |
| Ni | 0.54 | 0.54 |
| Pb | 4.38 | 4.63 |
| Zn | 43.9 | 43.9 |

Interpretation

This specification, including the claims, is intended to be interpreted as follows:

Embodiments or examples described in the specification are intended to be illustrative of the invention, without limiting the scope thereof. The invention is capable of being practised with various modifications and additions as will readily occur to those skilled in the art. Accordingly, it is to be understood that the scope of the invention is not to be limited to the exact construction and operation described or illustrated, but only by the following claims.

The mere disclosure of a method step or product element in the specification should not be construed as being essential to the invention claimed herein, except where it is either expressly stated to be so or expressly recited in a claim.

The terms in the claims have the broadest scope of meaning they would have been given by a person of ordinary skill in the art as of the relevant date.

The terms "a" and "an" mean "one or more", unless expressly specified otherwise.

Neither the title nor the abstract of the present application is to be taken as limiting in any way as the scope of the claimed invention.

Where the preamble of a claim recites a purpose, benefit or possible use of the claimed invention, it does not limit the claimed invention to having only that purpose, benefit or possible use.

In the specification, including the claims, the term "comprise", and variants of that term such as "comprises" or "comprising", are used to mean "including but not limited to", unless expressly specified otherwise, or unless in the context or usage an exclusive interpretation of the term is required.

The disclosure of any document referred to herein is incorporated by reference into this patent application as part of the present disclosure, but only for purposes of written description and enablement and should in no way be used to limit, define, or otherwise construe any term of the present application where the present application, without such incorporation by reference, would not have failed to provide an ascertainable meaning. Any incorporation by reference does not, in and of itself, constitute any endorsement or ratification of any statement, opinion or argument contained in any incorporated document.

Reference to any background art or prior art in this specification is not an admission such background art or prior art constitutes common general knowledge in the relevant field or is otherwise admissible prior art in relation to the validity of the claims.

The invention claimed is:

1. A computer-implemented method of automatically identifying the presence of one or more elements in a sample via optical emission spectroscopy, the method including the steps of
   obtaining sample spectrum data from the sample,
   obtaining a list of one or more predetermined emission wavelengths for each element in the periodic table quantifiable by optical emission spectroscopy, each predetermined emission wavelength being associated with a list of one or more potential interference emission wavelengths,
   determining a list of one or more analyte wavelengths corresponding to spectral peaks in the sample spectrum data based on the list of emission wavelengths,
   for each analyte wavelength, determining whether the corresponding spectral peak has a likelihood of being affected by an interference emission wavelength causing spectral interference based on the list of one or more potential interference emission wavelengths corresponding to the analyte wavelength,
   determining a revised list of one or more analyte wavelengths by removing from the list of analyte wavelengths, analyte wavelengths corresponding to spectral peaks having a likelihood of being affected by an interference emission wavelength, and
   determining a level of confidence that one or more elements are present in the sample based on a set of criteria applied to the revised list of analyte wavelengths.

2. The computer-implemented method of claim 1, wherein
   the sample spectrum data includes data representing emission strength intensities corresponding to wavelengths within a sample spectral range, and
   wherein the step of determining the list of analyte wavelengths includes
      analysing a region of interest of the sample spectral range corresponding to each predetermined emission wavelength of each element,
      determining whether a saturated result is located within the region of interest,
      upon determining that a saturated result is not located within the region of interest, determining whether a peak in the emission strength intensities is located within the region of interest.

3. The computer-implemented method of claim 2, wherein the step of determining the list of analyte wavelengths further includes determining whether the saturated result represents a peak in the emission strength intensities having a flat-top.

4. The computer-implemented method according to claim 2, wherein the step of determining the list of analyte wavelengths further includes
   determining a level of confidence that a peak in the emission strength intensities has been identified in the region of interest based on a threshold test.

5. The computer-implemented method according to claim 4, wherein determining a level of confidence that a peak in the emission strength intensities has been identified in the region of interest includes calculating a Standard Deviation of emission strength intensities proximate the peak to determine a confidence factor.

6. The computer-implemented method of claim 5, wherein an element associated with the peak is attributed as identified if the confidence factor is greater than a predetermined threshold.

7. The computer-implemented method of claim 1, wherein the step of determining whether the corresponding spectral peak of each analyte wavelength has a likelihood of being affected by an interference emission wavelength includes
   determining a clean interference emission wavelength associated with each analyte wavelength, and determining whether the clean interference emission wavelength corresponds to a spectral peak in the sample spectrum data.

8. The computer-implemented method of claim 7, wherein the step of determining a clean interference emission wavelength includes determining an interference emission wavelength least likely to be affected by spectral interference.

9. The computer implemented method of claim 7, further including
determining, for each analyte wavelength corresponding to a spectral peak being affected by spectral interference, the significance of the spectral interference based on any one or more of
a distance between a spectral peak corresponding to the clean interference emission wavelength and a spectral peak corresponding to the associated analyte wavelength;
a ratio of a spectral peak corresponding to the clean interference emission wavelength and a spectral peak corresponding to the associated analyte wavelength; and
a ratio of an emission strength intensity corresponding to the clean interference emission wavelength and an emission strength intensity corresponding to the associated analyte wavelength.

10. The computer implemented method of claim 1, wherein the set of criteria for determining a level of confidence that one or more elements are present in the sample includes any one or more of
whether a number of detected primary analyte wavelengths corresponding to each element in the revised list of analyte wavelengths is higher than a first threshold, and
whether a number of detected primary and secondary analyte wavelengths corresponding to each element in the revised list of analyte wavelengths is higher than a second threshold,
wherein a primary analyte wavelength for an element corresponds to an emission wavelength having a high peak spectral intensity, and a secondary analyte wavelength for an element corresponds to an emission wavelength having a lower peak spectral intensity than that for a primary analyte wavelength.

11. The computer implemented method of claim 10, wherein
the first threshold is two for elements having at least three primary analyte wavelengths and one for elements having two or less primary analyte wavelengths.

12. A computer implemented method according to claim 1, further including
adding one or more elements to a list of identified elements based on the determined level of confidence.

13. The computer implemented method of claim 12, further including
validating each element in the list of identified elements to determine whether a spectral peak of the sample spectrum data associated with an analyte wavelength is likely to be affected by an interference emission wavelength causing spectral interference, and
upon determining that an analyte wavelength having a corresponding element in the list of identified elements is likely to be affected by an interference emission wavelength causing spectral interference, removing the corresponding element from the list of identified elements.

14. The computer implemented method of claim 12, further including
selectively displaying analyte wavelengths corresponding to each element in the list of identified elements based on selection criteria, wherein the selection criteria includes any one or more of
whether the analyte wavelength is associated with a saturated result,
a maximum number of analyte wavelengths to display for each corresponding element, and
whether an analyte wavelength is associated with a user selection.

15. The computer implemented method of claim 12, further including
calculating a concentration of each element in the list of identified elements,
wherein the step calculating the concentration of each element includes measuring an emission strength intensity of a spectral peak associated with the corresponding element and correcting for background emission.

16. The computer implemented method of claim 1, further including
identifying outlier analyte wavelengths, and
reducing the level of confidence that a corresponding element is present in the sample based on a measurement associated with the outlier analyte wavelength.

17. A system for automatically identifying the presence of one or more elements in a sample via optical emission spectroscopy, the system including
an optical emission spectrometer for obtaining sample spectrum data from the sample, and
a processor for performing a computer-implemented method according to any one of the preceding claims.

18. A computer system for automatically identifying the presence of one or more elements in a sample via optical emission spectroscopy, the system including
a sample data retrieving module for obtaining sample spectrum data from the sample,
a wavelength data retrieving module for obtaining a list of one or more predetermined emission wavelengths for each element in the periodic table quantifiable by optical emission spectroscopy, each predetermined emission wavelength being associated with a list of one or more potential interference emission wavelengths,
a peak search module for determining a list of one or more analyte wavelengths corresponding to spectral peaks in the sample spectrum data based on the list of emission wavelengths,
an interference search module for determining, for each analyte wavelength, whether the corresponding spectral peak has a likelihood of being affected by an interference emission wavelength causing spectral interference based on the list of one or more potential interference emission wavelengths corresponding to the analyte wavelength,
a wavelength processing module for determining a revised list of one or more analyte wavelengths by removing from the list of analyte wavelengths, analyte wavelengths corresponding to spectral peaks having a likelihood of being affected by an interference emission wavelength, and
an element identification module for determining a level of confidence that one or more elements are present in the sample based on a set of criteria applied to the revised list of analyte wavelengths.

* * * * *